(12) United States Patent
Lee et al.

(10) Patent No.: US 11,920,287 B2
(45) Date of Patent: Mar. 5, 2024

(54) CLOTHES DRYER CONFIGURED FOR MOTOR COOLING

(71) Applicant: LG Electronics Inc., Seoul (KR)

(72) Inventors: Hyuksoo Lee, Seoul (KR); Hongjun Cho, Seoul (KR); Hyojun Kim, Seoul (KR); Yangguk Hwang, Seoul (KR); Hyeonjoong Kim, Seoul (KR); Oshin Kwon, Seoul (KR); Minji Kim, Seoul (KR); Yeonju Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 23 days.

(21) Appl. No.: 17/466,656

(22) Filed: Sep. 3, 2021

(65) Prior Publication Data
US 2022/0074107 A1 Mar. 10, 2022

(30) Foreign Application Priority Data

Sep. 4, 2020 (KR) .................. 10-2020-0113131
Sep. 4, 2020 (KR) .................. 10-2020-0113132
Sep. 4, 2020 (KR) .................. 10-2020-0113133

(51) Int. Cl.
*D06F 58/20* (2006.01)
*D06F 58/02* (2006.01)
(Continued)

(52) U.S. Cl.
CPC .............. *D06F 58/20* (2013.01); *D06F 58/02* (2013.01); *D06F 58/08* (2013.01); *H02K 1/30* (2013.01);
(Continued)

(58) Field of Classification Search
CPC .......... D06F 58/08; D06F 58/20; D06F 58/02; D06F 37/30; H02K 7/116; H02K 7/14;
(Continued)

(56) References Cited

U.S. PATENT DOCUMENTS 3,060,593 A 10/1962 Flora et al.
4,489,507 A 12/1984 Kawai
(Continued)

FOREIGN PATENT DOCUMENTS

CN 201254659 6/2009
CN 208158298 11/2018
(Continued)

OTHER PUBLICATIONS

KR20060004363A English translation (Year: 2023).*
(Continued)

*Primary Examiner* — Christopher M Koehler
*Assistant Examiner* — Viswanathan Subramanian
(74) *Attorney, Agent, or Firm* — Fish & Richardson P.C.

(57) ABSTRACT

A dryer includes a drum including a drum body, a front cover with a drum inlet, and a rear cover with an air inlet, a fixing panel that has a first cooling hole and a second cooling hole, a motor configured to rotate the drum, where the fixing panel further defines supply holes arranged along a circumferential surface of the motor and configured to guide air to the air inlet, a supply duct fixed to the fixing panel and configured to guide air to the supply holes, where the supply duct defines an accommodating space that accommodates the motor, and a duct cover that connects together the first cooling hole, the accommodating space, and the second cooling hole and that is configured to circulate air through the first cooling hole, the accommodating space, and the second cooling hole to thereby cool the motor.

19 Claims, 16 Drawing Sheets

(51) Int. Cl.

| | |
|---|---|
| *D06F 58/08* | (2006.01) |
| *H02K 1/30* | (2006.01) |
| *H02K 7/08* | (2006.01) |
| *H02K 7/116* | (2006.01) |
| *H02K 7/14* | (2006.01) |
| *H02K 9/06* | (2006.01) |
| *H02K 21/22* | (2006.01) |

(52) U.S. Cl.
CPC ............ *H02K 7/085* (2013.01); *H02K 7/116* (2013.01); *H02K 7/14* (2013.01); *H02K 9/06* (2013.01); *H02K 21/22* (2013.01)

(58) Field of Classification Search
CPC ............ H02K 9/06; H02K 1/30; H02K 7/085; H02K 21/22
See application file for complete search history.

(56) References Cited

U.S. PATENT DOCUMENTS

| | | |
|---|---|---|
| 4,910,979 A | 3/1990 | Burk |
| 2018/0094376 A1 | 4/2018 | Kitayama |

FOREIGN PATENT DOCUMENTS

| | | |
|---|---|---|
| CN | 110469637 | 11/2019 |
| DE | 1410964 | 5/1971 |
| EP | 1282738 | 2/2003 |
| EP | 3617394 | 3/2020 |
| JP | 2003144789 | 5/2003 |
| JP | 2004041771 | 2/2004 |
| JP | 2006075417 | 3/2006 |
| KR | 20010052443 | 6/2001 |
| KR | 20060004363 | 1/2006 |
| KR | 101249717 | 4/2013 |
| KR | 20200026077 | 3/2020 |
| KR | 20200065931 | 6/2020 |
| KR | 20200066169 | 6/2020 |
| WO | WO2020111817 | 6/2020 |

OTHER PUBLICATIONS

CN110469637A English translation (Year: 2023).*
KR20200066169A English translation (Year: 2023).*
Extended European Search Report in European Appln. No. 21194756.9, dated Dec. 8, 2021, 9 pages.
Extended European Search Report in European Appln. No. 21194758.5, dated Dec. 23, 2021, 10 pages.
Extended European Search Report in European Appln. No. 21194763.5, dated Dec. 23, 2021, 10 pages.
International Search Report and Written Opinion in International Appln. No. PCT/KR2021/011904, dated Dec. 22, 2021, 8 pages.
International Search Report and Written Opinion in International Appln. No. PCT/KR2021/011905, dated Dec. 22, 2021, 9 pages.
International Search Report and Written Opinion in International Appln. No. PCT/KR2021/011907, dated Dec. 27, 2021, 9 pages.
Office Action in Japanese Appln. No. 2023-514984, dated Nov. 28, 2023, 7 pages (with English translation).

* cited by examiner

FIG. 16
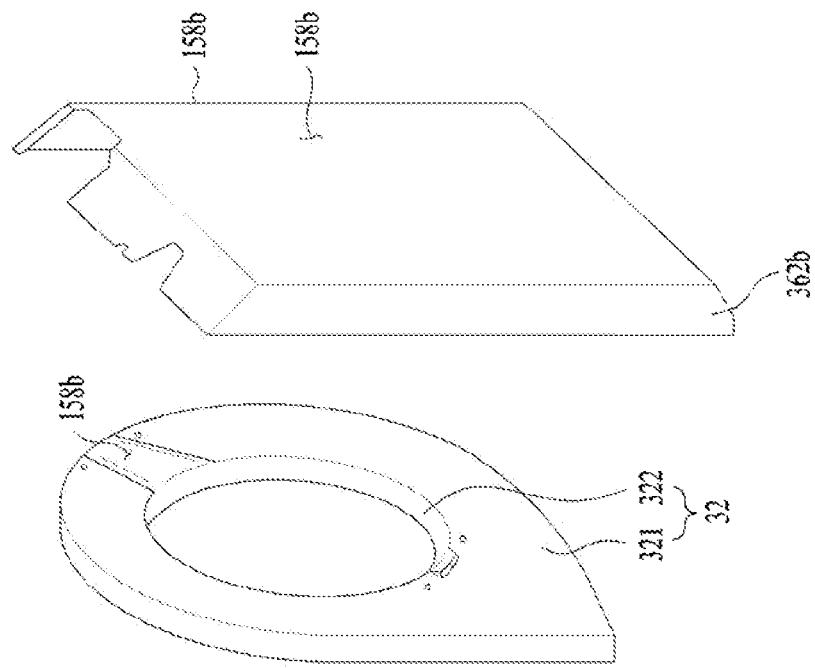
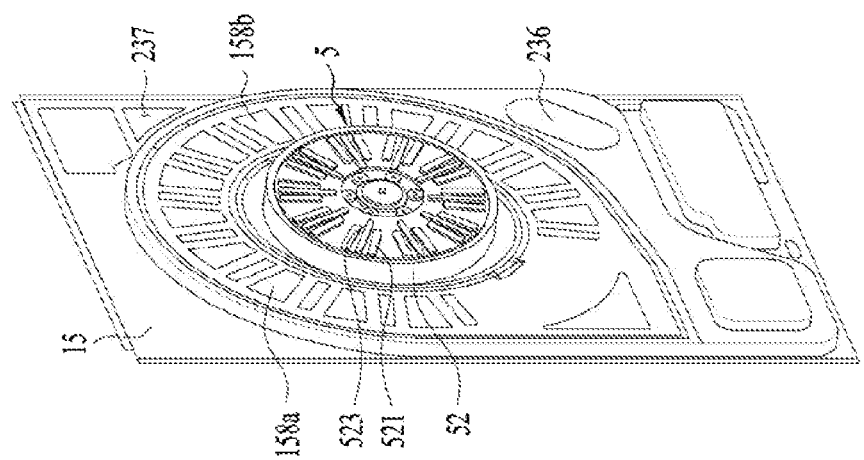

CLOTHES DRYER CONFIGURED FOR MOTOR COOLING

CROSS-REFERENCE TO RELATED APPLICATIONS

This application claims the benefit of Korean Patent Application No. 10-2020-0113131, filed on Sep. 4, 2020, Korean Patent Application No. 10-2020-0113132, filed on Sep. 4, 2020, and Korean Patent Application No. 10-2020-0113133, filed on Sep. 4, 2020, the disclosures of which are hereby incorporated by reference as if fully set forth herein.

TECHNICAL FIELD

The present disclosure relates to a dryer, and more particularly, to a dryer with an improved power transmission mechanism between a drum and a motor rotating the motor.

BACKGROUND

A dryer is a device for drying an object by supplying hot air into an object container.

For example, drum dryers may include an object container shaped into a cylindrical drum, and hot air may be introduced into the drum during rotation of the drum. Particularly, a drum dryer with a drum rotating roughly around a horizontal axis is often used as a household dryer.

The drum dryer may use a motor for rotating the drum, and the driving force of the motor may be transmitted to the drum through a power transmitter such as a belt to rotate the drum. The rotation axis of the motor may be different from the rotation axis of the drum of a belt type dryer.

In some cases, power loss may occur due to the power transmitter such as a belt, and a separate space may be provided inside a case to mount the power transmitter such as a motor and a belt.

Drum washing machines may include a direct connection (or direct drive) drum type that is different from the belt type. For instance, in the direct connection type, the rotation axis of the motor may be coaxial with that of the drum, and the stator of the motor may be mounted on the rear or lower wall of a tub. A motor used in a washing machine may be called a direct drive (DD) motor, and the washing machine may be called a DD washing machine.

The direct connection type may have a wide variety of advantages compared to the belt type. For example, a drum driving revolutions per minute (RPM) and a drum torque may be variously changed and controlled in various environments. In some cases, a drum rotation direction or a drum rotation angle may be controlled. Further, reduced power loss leads to energy saving.

A washer dryer may include a motor provided in a tub, thereby facilitating application of a drum-motor direct connection structure. In some cases, a pure dryer without a washing function may not include a tub for fixing a motor, and thus it may not be easy to implement a direct connection-type dryer in the pure dryer.

SUMMARY

The present disclosure describes a dryer with a driving unit that can reduce and transfer the rotation speed of a rotor to a drum, in which the rotation center of the rotor is located on a concentric axis with the rotation center of the drum.

The present disclosure also describes a dryer that can minimize the volume of a driving unit.

The present disclosure also describes a dryer with an improved flow path of air supplied to a drum.

The present disclosure also describes a dryer with an improved cooling flow path of a motor that drives a drum.

The present disclosure also describes a dryer with an improved fixing structure for fixing a motor and a power transmitter.

The present disclosure also describes a dryer that can reduce vibrations generated from a power transmitter that transfers the power of a motor.

According to one aspect of the subject matter described in this application, a dryer includes a drum including a drum body that defines a space configured to receive clothes, a front cover that defines a front surface of the drum body and a drum inlet that is in communication with the space of the drum body, and a rear cover that defines a rear surface of the drum body and an air inlet, a fixing panel that is spaced apart from the rear cover of the drum and defines a first cooling hole and a second cooling hole that are spaced apart from each other, a motor including a stator fixed to the fixing panel and a rotor configured to rotate relative to the stator, where the motor is configured to rotate the drum based on the rotor rotating relative to the stator, and the fixing panel further defines a plurality of supply holes arranged along an outer circumferential surface of the motor and configured to guide air to the air inlet of the rear cover, a supply duct fixed to the fixing panel and configured to guide air to the plurality of supply holes, where the supply duct has a ring shape and defines an accommodating space that accommodates the motor, and a duct cover that connects together the first cooling hole, the accommodating space, and the second cooling hole, where the duct cover is configured to circulate air through the first cooling hole, the accommodating space, and the second cooling hole to thereby cool the motor.

Implementations according to this aspect can include one or more of the following features. For instance, the first cooling hole can be defined at a lower part of the fixing panel relative to the accommodating space, and the second cooling hole can be defined at an upper part of the fixing panel relative to the accommodating space. In some examples, the supply duct can define an exhaust passage at a side thereof, where the exhaust passage is configured to discharge air from the accommodating space, and the second cooling hole faces an end of the exhaust passage.

In some examples, the duct cover can include a first cooling duct configured to guide air from the first cooling hole to the accommodating space, a cover plate that covers the accommodating space and is configured to receive air guided by the first cooling duct, and a second cooling duct that extends from the cover plate to the second cooling hole. In some examples, the duct cover can be fixed to the fixing panel and define an enclosure that covers the first cooling hole, the accommodating space, the supply duct, and the second cooling hole.

In some implementations, the duct cover can include a cover plate having an area that is greater than areas defined by the first cooling hole, the supply duct, and the second cooling hole, and a cover sidewall located at an outer circumferential surface of the cover plate and fixed to the fixing panel at a position above the supply duct.

In some implementations, the rotor can include a plurality of vanes that extend in a radial direction and are configured to move air in the accommodating space. In some examples, the rotor can define a plurality of rotor through-holes that extend in the radial direction and are configured to discharge air from an inside of the rotor.

In some implementations, at least one of the first cooling hole or the second cooling hole can be configured to accommodate a circulation fan. In some implementations, the dryer can include a power transmitter that includes a housing fixed to the fixing panel, a first shaft located at the housing and coupled to the rotor, a second shaft located at the housing and coupled to the rear cover of the drum, and an interlocking gear located at the housing and configured to decelerate a rotational speed of the first shaft, where the interlocking gear is configured to transmit rotational force from the first shaft to the second shaft.

In some examples, the power transmitter can further include a driving gear defined at an end of the first shaft and configured to transmit the rotational force to the interlocking gear, and a driven gear defined at an end of the second shaft and configured to receive the rotational force from the interlocking gear. The interlocking gear can include a first gear meshed with the driving gear and configured to be rotated by the driving gear, and a second gear meshed with the driven gear and configured to rotate coaxially with the first gear, where a diameter of the second gear is less than a diameter of the first gear.

According to another aspect, a dryer a drum including a drum body that defines a space configured to receive clothes, a front cover that defines a front surface of the drum body and a drum inlet that is in communication with the space of the drum body, and a rear cover that defines a rear surface of the drum body and an air inlet, a fixing panel spaced apart from the rear cover of the drum, a motor including a stator fixed to the fixing panel and a rotor configured to rotate relative to the stator, where the motor is configured to rotate the drum based on the rotor rotating relative to the stator, and the fixing panel further defines a plurality of supply holes arranged along an outer circumferential surface of the motor and configured to guide air to the air inlet, a supply duct that is fixed to the fixing panel and defines an accommodating space that accommodates the motor and a cooling passage that extends outward from the accommodating space, where the cooling passage is configured to discharge air to an outside the supply duct, and a duct cover that covers the accommodating space and the cooling passage and that is configured to guide air between the accommodating space and the cooling passage.

Implementations according to this aspect can include one or more of the following features. For example, an inner circumferential surface of the accommodating space faces the outer circumferential surface of the motor, and the cooling passage can extend radially outward from the inner circumferential surface of the accommodating space to an outer circumferential surface of the supply duct. In some implementations, the fixing panel can define a first cooling hole and a second cooling hole that are spaced apart from each other, where at least one of the first cooling hole or the second cooling hole is in fluid communication with an end of the cooling passage.

In some examples, the first cooling hole can be defined at a lower part of the fixing panel relative to the accommodating space, and the second cooling hole can be defined at an upper part of the fixing panel relative to the accommodating space, where the second cooling hole is in fluid communication with the end of the cooling passage.

In some implementations, the duct cover can protrude outward relative to an outer circumference of the supply duct and covers the first cooling hole and the second cooling hole. In some examples, the duct cover can include a first cooling duct configured to guide air from the first cooling hole to the accommodating space, a cover plate that covers the accommodating space and is configured to receive air guided by the first cooling duct, and a second cooling duct that extends from the cover plate to the second cooling hole.

In some implementations, the duct cover can include a cover plate that covers the accommodating space and that protrudes outward relative to the supply duct to thereby cover the first cooling hole and the second cooling hole, and a cover sidewall that extends from an outer circumferential surface of the cover plate to the fixing panel and is fixed to the fixing panel. In some examples, the first cooling hole and the second cooling hole can be defined at positions outward relative to an outer circumferential surface of the supply duct. In some examples, the cooling passage can extend from an inner circumference of the accommodating space to the outer circumferential surface of the supply duct, where the cooling passage faces the second cooling hole.

Additional aspects will be set forth in part in the description which follows and, in part, will be apparent from the description, or can be learned by practice of the presented implementations of the disclosure.

BRIEF DESCRIPTION OF THE DRAWINGS

The accompanying drawings, which are included to provide a further understanding of the disclosure and are incorporated in and constitute a part of this application, illustrate implementation(s) of the disclosure and together with the description serve to explain the principle of the disclosure.

FIG. 16 is a perspective view illustrating an example of a driving unit cooling structure.

DETAILED DESCRIPTION

Reference will now be made in detail to an implementation of the present disclosure, examples of which are illustrated in the accompanying drawings. Wherever possible, the same reference numbers will be used throughout the drawings to refer to the same or like parts. Further, lest it should obscure the subject matter of the present disclosure, a detailed description of a known configuration or structure will not be provided.

One or more examples of a dryer will be described below in detail.

Figure 1:
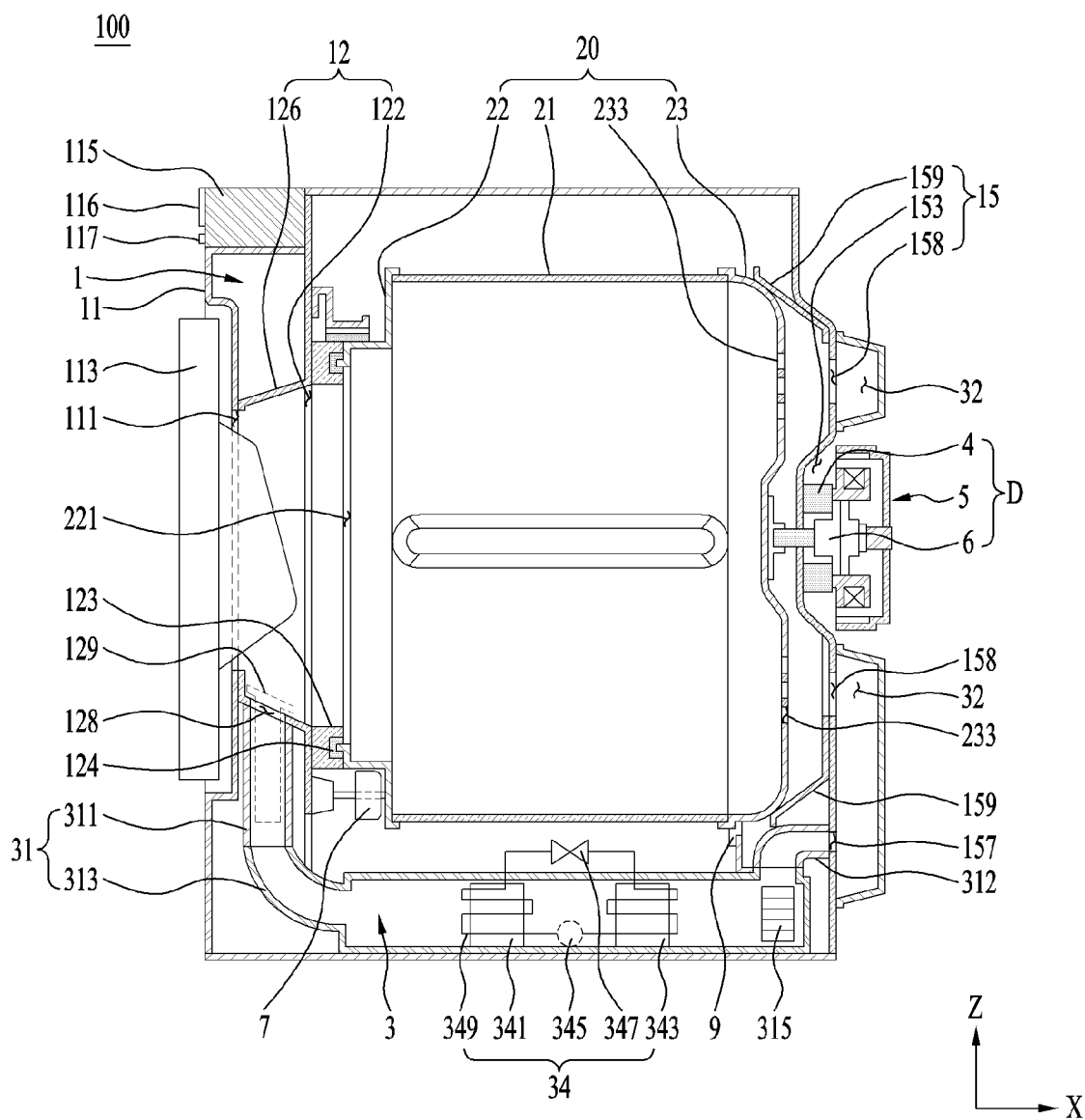
FIG. 1 is a sectional view illustrating an example of a dryer.
Figure 2:
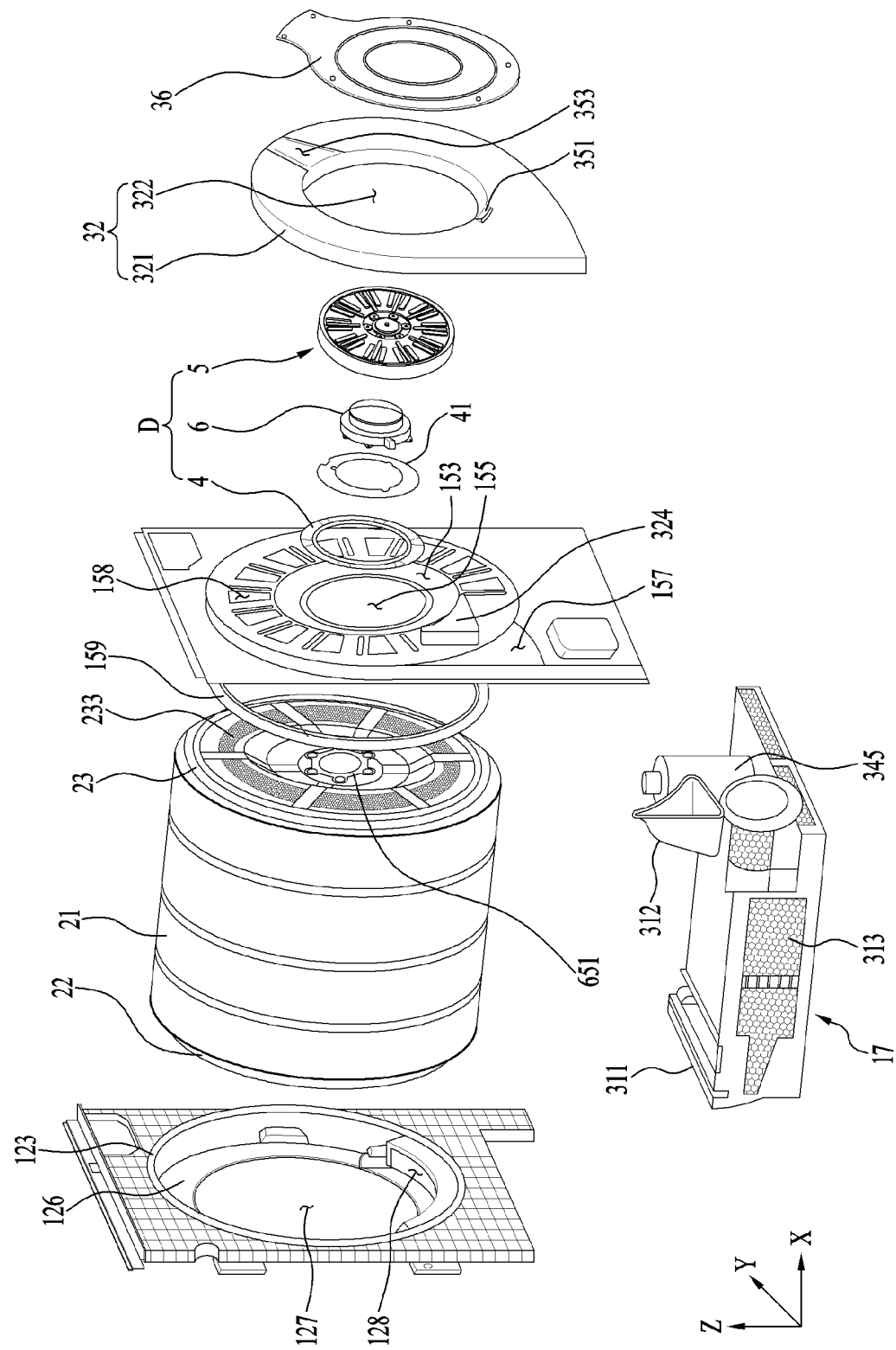
FIG. 2 is an exploded perspective view illustrating the dryer.

FIG. 1 is a sectional view illustrating an example of a dryer, and FIG. 2 is an exploded perspective view illustrating the dryer.

Referring to FIG. 1, a dryer 100 can include a cabinet 1, a drum 20 rotatably mounted in the cabinet 1 and providing a space for accommodating clothes (laundry or an object to be dried) therein, a supply 3 supplying hot dry air (air at a higher temperature than room temperature or air with higher dryness than the dryness of indoor air), and a driving unit D rotating the drum 20.

In some implementations, the cabinet 1 can include a front panel 11 forming the front surface of the dryer 100 and a base panel 17 forming the bottom surface of the dryer 100. The front panel 11 can define an inlet 111 communicating with the drum 20. The inlet 111 can be provided with a door 113, so that the inlet 111 is closed by the door 113.

The front panel 11 can be provided with a control panel 115, and the control panel 114 can be provided with an input unit 116 that receives a control command from a user and a display 117 that outputs information such as control commands selectable by the user. The input unit 116 can include a power supply requester requesting supply of power to the dryer 100, a course input unit that allows the user to select an intended course from among a plurality of courses, and an execution requester requesting starting of the user-selected course.

The drum 20 can be shaped into a hollow cylinder. In the illustrated example of FIG. 1, the drum 20 includes a cylindrical drum body 21 opened at the front and rear surfaces thereof, a front cover 22 forming the front surface of the drum body 21, and a rear cover 23 forming the rear surface of the drum body 21. The front cover 22 can be provided with a drum inlet 221 that communicates the inside of the drum body 21 with the outside of the drum body 21.

The drum 20 can be rotatably fixed to at least one of a support panel 12 or a fixing panel 15. In the illustrated example of FIG. 1, the rear cover 23 is rotatably fixed to the fixing panel 15 through the driving unit D, and the front cover 22 is rotatably connected to the support panel 12.

The support panel 12 can be fixed to the cabinet 1 and disposed between the front panel 11 and the front cover 22. In the illustrated example of FIG. 1, the support panel 12 is fixed to the base panel 17 and disposed between the front panel 11 and the front cover 22. In this case, the rear surface (a surface facing the support panel 12) of the front panel 11 can be fixed to the support panel 12, and the bottom of the front panel 11 can be fixed to the base panel 17.

The support panel 12 can include a support panel through-hole 122, a drum connection body 123 connecting the support panel through-hole 122 to the drum inlet 221, and a panel connection body 126 connecting the support panel through-hole 122 to the inlet 111.

The support panel through-hole 122 can penetrate through the support panel 12, for communicating the inlet 111 with the drum inlet 221.

The drum connection body 123 can be provided as a pipe fixed to the rear surface of the support panel 12 (a surface facing the drum inlet 221 in a space provided by the support panel 12). The drum connection body 123 can have one end surrounding the support panel through-hole 122 and a free end supporting the front cover 22. That is, the free end of the drum connection body 123 can be inserted into the drum inlet 221 or contact a free end of the front cover 22 forming the drum inlet 221.

In the illustrated example of FIG. 1, the free end of the drum connection body 123 contacts the free end of the front cover 22. In this case, the drum connection body 123 can be provided with a ring-shaped damper (connection damper) 124. The connection damper 124 is a device that can minimize the risk of separating the drum inlet 221 from the drum connection body 123 (the risk of leaking air inside the drum 20 into the cabinet 1), when the drum 20 rotates or vibrates.

The connection damper 124 can be formed of a compressible material (a material with a volume increasing or decreasing by an external force). In this case, the connection damper 124 can be kept in a compressed state between the free end of the drum connection body 123 and an edge of the drum inlet 221 (the free end of the front cover 22). This is for minimizing separation of the drum inlet 221 from the drum connection body 123, when the drum 20 vibrates between the support panel 12 and the fixing panel 15. A felt manufactured by compressing fibers can be an example of the material of the connection damper 124.

The panel connection body 126 can be provided as a pipe fixed to the front surface of the support panel 12 (the surface facing the front panel 11 in the space provided by the support panel 12). The panel connection body 126 can have one end surrounding the support panel through-hole 122, and the other end connected to the inlet 111. Accordingly, clothes introduced to the inlet 111 can enter the drum body 21 through the panel connection body 126, the support panel through-hole 122, the drum connection body 123, and the drum inlet 221.

The fixing panel 15 can be fixed to the cabinet 1 at a position apart from the rear cover 23. In the illustrated example of FIG. 1, the fixing panel 15 is fixed to the base panel 17 to form the rear surface of the dryer 100 (the rear surface of the cabinet 1).

Referring to FIG. 2, the fixing panel 15 can be provided with a driving unit mounting recess 153 defining a space for mounting the driving unit D therein. The driving unit mounting recess 153 can be a recess concavely bent from the fixing panel 15 toward the rear cover 23 of the drum 20. The fixing panel 15 is provided with a fixing panel through-hole 155 through which a rotation shaft of the drum 20 passes. The fixing panel through-hole 155 can be located in the driving unit mounting recess 153.

The support panel 12 can be provided with a drum exhaust port (a first exhaust port) 128 penetrating through the panel connection body 126, and the fixing panel 15 can be provided with a panel exhaust port (a second exhaust port) 157 and a supply port 158.

The supply port 158 can include a plurality of supply holes which penetrate through the fixing panel 15 and are arranged to surround the driving unit mounting recess 153 (the plurality of supply holes can form a ring surrounding the driving unit mounting recess 153).

As illustrated in FIG. 1, the supply 3 can include an exhaust duct 31 connecting the first exhaust port 128 and the second exhaust port 157 to each other, a supply duct 32 guiding air discharged from the second exhaust port 157 to the supply port 158, and a heat exchange unit 34 provided in the exhaust duct 31 to sequentially dehumidify and heat the air. A filter 129 can be provided in the first exhaust port 128, for filtering air flowing from the drum 20 to the exhaust duct 31.

The exhaust duct 31 may be provided to include a first duct 311 connected to the first exhaust port 128, a second duct 312 connected to the second exhaust port 157 and a third duct 313 connected between the first duct 311. The third duct 313 may be fixed to the base panel 17.

The exhaust duct 31 can be provided with a fan 315 blowing air inside the drum 20 to the second exhaust port 157. In the illustrated example of FIG. 1, the fan 315 is disposed between the heat exchange unit 34 and a second duct 312.

The heat exchange unit 34 can be provided with various devices capable of sequentially dehumidifying and heating the air introduced into the exhaust duct 31. In the illustrated example of FIG. 1, the heat exchange unit 34 is provided as a heat pump.

That is, the heat exchange unit 34 of FIG. 1 includes a first heat exchanger (a heat absorber) 341 removing moisture from the air introduced into the exhaust duct 31, and a second heat exchanger (a heater) 343 provided inside the exhaust duct 31 and heating the air that has passed through the heat absorber 341.

The heat absorber 341 and the heater 343 are sequentially arranged along an air flow direction and connected to each other through a refrigerant pipe 349 forming a refrigerant circulation path. A refrigerant flows along the refrigerant pipe 349 by a compressor 345 located outside the exhaust duct 31, and the refrigerant pipe 349 is provided with a pressure regulator 347 adjusting the pressure of the refrigerant flowing from the heater 343 to the heat absorber 341.

The heat absorber 341 is a device that can cool the air (evaporating the refrigerant) by transferring heat of the air introduced into the exhaust duct 31 to the refrigerant, and the heater 343 is a device that can heat the air (condensing the refrigerant) by transferring the heat of the refrigerant that has passed through the compressor 345 to the air.

As illustrated in FIG. 2, the supply duct 32 is a structure that can be fixed to the fixing panel 15 and that can guide the air discharged from the second exhaust port 157 to the supply port 158.

When the supply port 158 includes a plurality of supply holes arranged in the shape of a ring, the supply duct 32 can include a duct body 321 which is fixed to the fixing panel 15 and forms a flow path connecting the second exhaust port 157 and the supply port 158, and a rotor accommodator 322 penetrating through the duct body 321. The driving unit D fixed in the driving unit mounting recess 153 is exposed to the outside of the supply duct 32 by the rotor accommodator 322.

The drum 20 can include an air inlet 233 penetrating through the rear cover 23 to supply the air introduced into the cabinet 1 to the drum 20, and the fixing panel 15 can include a flow path generator 159 guiding the air discharged from the supply port 158 to the air inlet 233.

The air inlet 233 can be provided by arranging a plurality of holes penetrating through the rear cover 23 in the shape of a ring surrounding a rotation center of the drum 20. The flow path generator 159 can be provided as a pipe having one end (one end fixed to the fixing panel 15) surrounding the supply port 158 and the other end (one end contacting the drum 20) surrounding the air inlet 233. To minimize transfer of vibrations generated during rotation of the drum 20 to the fixing panel 15, the flow path generator 159 can be formed of a material having high elasticity (such as rubber).

The driving unit D can include a motor 5 fixed in the driving unit mounting recess 153 and a power transmitter 6 transferring power generated by the motor 5 to the drum 20.

To minimize the deformation of the fixing panel 15 caused by the weight of the driving unit D and an external force generated during operation of the driving unit D, a driving unit bracket 4 can be provided in the driving unit mounting recess 153, to provide a space in which the motor 5 is fixed. The driving unit bracket 4 can be formed into a metal ring (a stronger metal than the fixing panel 15) fixed in the driving unit mounting recess 153.

As illustrated in FIG. 2, the motor 5 can include a stator 51 fixed to the driving unit bracket 4 to form a rotating field, and a rotor 52 rotating by the rotating field.

The stator 51 can include a core 511 fixed to the driving unit bracket 4, a core through-hole 512 penetrating through the core 511, and electromagnets 513 arranged at equal intervals on a circumferential surface of the core 511.

The rotor 52 includes a disk-shaped rotor body 52a, a pipe-shaped rotor circumferential surface 52b fixed to the rotor body 52a, and a plurality of permanent magnets 525 fixed to the rotor circumferential surface 52b. The permanent magnets 525 are fixed to the rotor circumferential surface 52b in such a manner that N poles and S poles are alternately exposed.

The power transmitter 6 is used to decelerate or accelerate the rotational force of the motor 5 and transfer the decelerated or accelerated rotational force to the drum 20. Now, a detailed description will be given of the power transmitter 6 of the present disclosure with reference to the accompanying drawings.

Figure 3:
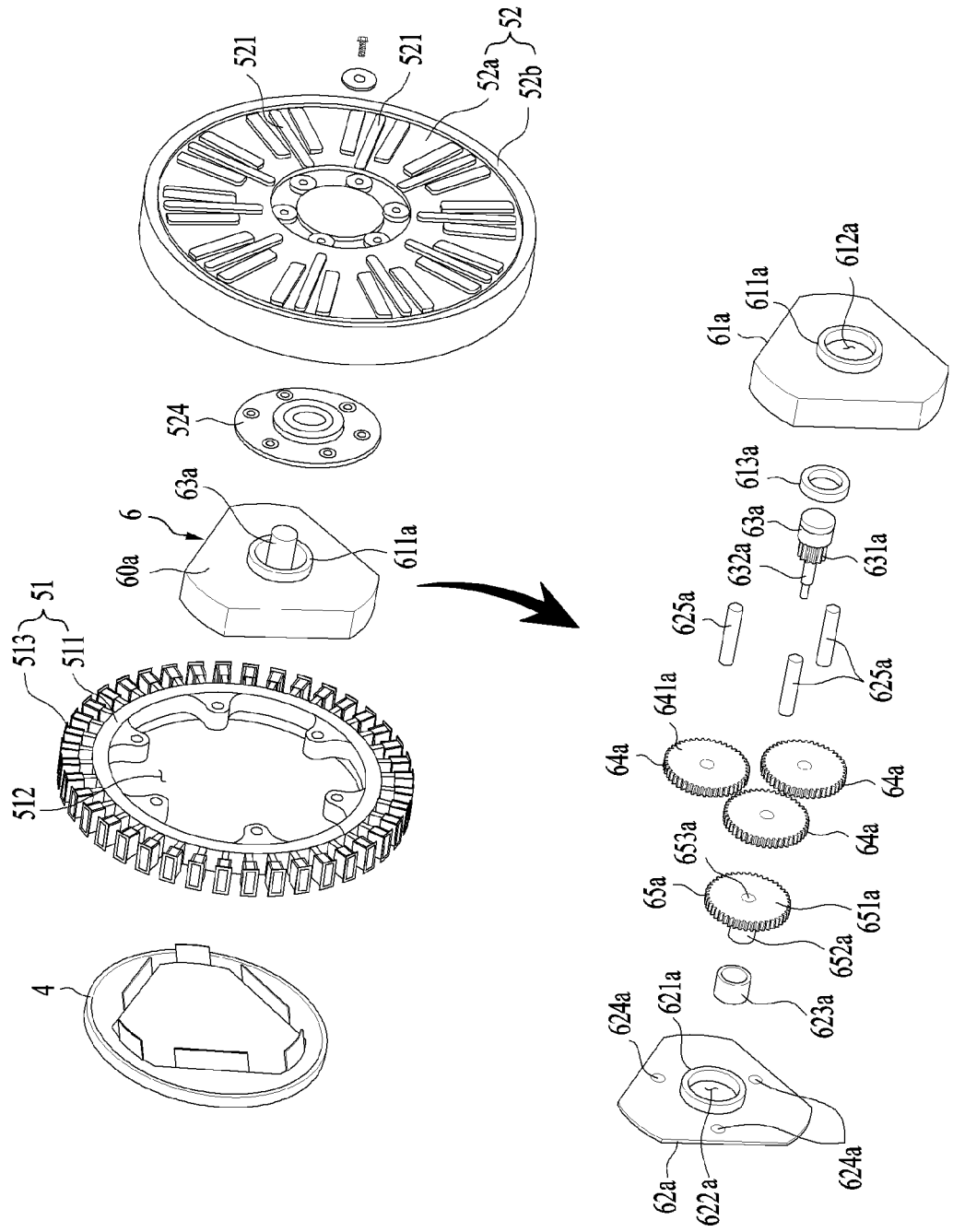
FIG. 3 is an exploded perspective view illustrating an example of a driving unit in the dryer.
Figure 4:
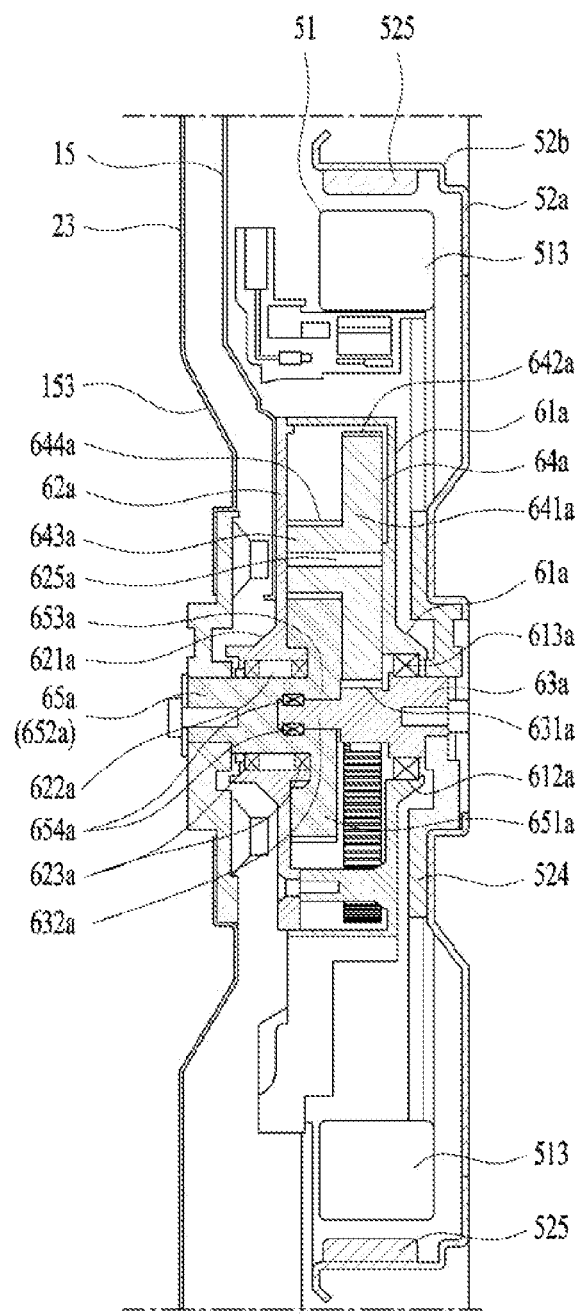
FIG. 4 is a sectional view illustrating the driving unit in the dryer.
Figure 5:
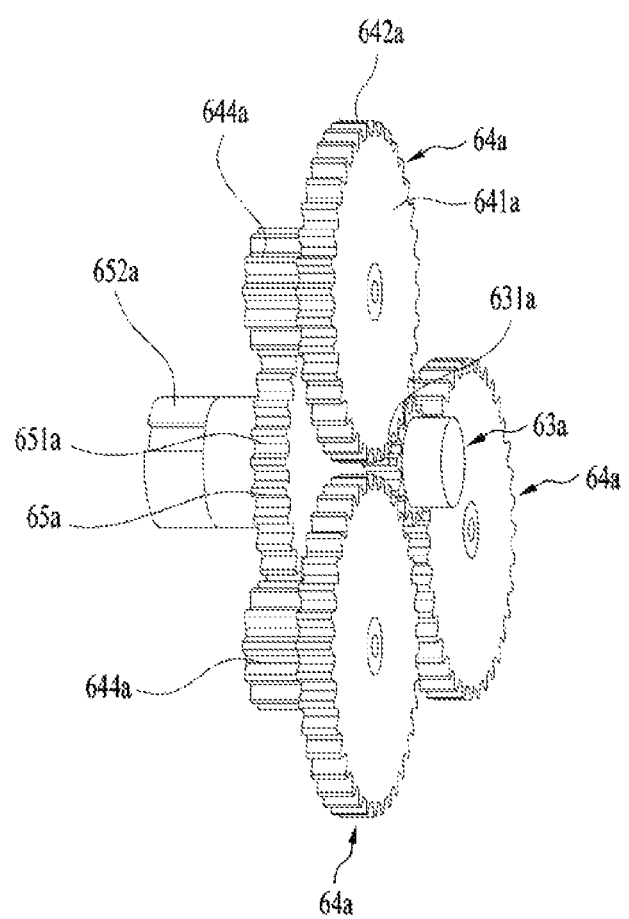
FIG. 5 is a perspective view illustrating an example of a gear unit in the driving unit.

Referring to FIGS. 3 and 4, in some implementations, the power transmitter 6 can include a housing 60a shaped into a hollow enclosure and fixed to the fixing panel 15, a first shaft 63a which has one end connected to the rotor body 52a and the other end located inside the housing 60a and on which a driving gear 631a is formed, a plurality of interlocking gears 64a meshed with the driving gear 631a and rotatably mounted in the housing 60a, and a driven gear 65a meshed with the interlocking gears 64a and including a second shaft 652a connected to the rear cover 23.

The first shaft 63a is used to transfer the rotational force of the rotor 52 to the interlocking gears 64a. The first shaft 63a can be provided with the driving gear 631a located inside the housing 60a. The first shaft 63a can extend from the driving gear 631a to the outside of the housing 60a and be connected to the rotor body 52a.

When the first shaft 63a is directly connected to the rotor body 52a, deformation can occur between the first shaft 63a and the rotor body 52a. To prevent the deformation of the rotor body 52a, the first shaft 63a can be fixed to the rotor body 52a through a fixing plate 524. The fixing plate 524 is fixed to the rotor body 52a to reinforce the strength of the rotor body 52a.

The driving gear 631a is provided, at an end thereof, with a driving gear shaft 632a inserted into a first shaft hole 653a of the driven gear 65a. The driving gear shaft 632a and the first shaft hole 653a are formed such that the rotation center of the first shaft 63a coincides with the rotation center of the driven gear 65a. That is, the driving gear 631a of the first shaft 63a and the second shaft 652a of the driven gear 65a can rotate on the same rotation axis.

The driven gear 65a can include a driven gear body 651a meshed with the interlocking gears 64a, the first shaft hole 653a formed at the center of the rotation axis of the driven gear body 651a, through which the driving gear shaft 632a of the first shaft 63a is inserted, and a first shaft hole bearing 654a provided in the first shaft hole 653a and rotatably supporting the driving gear shaft 632a.

The first shaft 63a and the driven gear 65a can be rotatably coupled with each other in a coaxial state by inserting the driving gear shaft 632a into the first shaft hole 653a. The coaxial coupling between the first shaft 63a and the driven gear 65a can prevent eccentricity during rotation of the first shaft 63a and the driven gear 65a.

The second shaft 652a is used to transfer the rotational force of the interlocking gears 64a to the drum 20. The second shaft 652a can be provided inside the housing 60a and extend from the driven gear 65a receiving power from the interlocking gears 64a. That is, the second shaft 652a can extend outward (i.e., in a direction to the drum 20) from the housing 60a around the rotation axis of the driven gear 65a.

The second shaft 652a can be integrally formed with the driven gear 65a. In some implementations, the second shaft 652a can define a concentric axis with the first shaft 63a. In some examples, where the second shaft 652a and the first shaft 63a define the concentric axis, vibrations generated in the power transmitter 6 can be minimized during rotation of the drum 20.

In some implementations, the housing 60a can be fixed to the fixing panel 15 and located in the core through-hole 512. The volume of the driving unit D can be minimized by minimizing the volume of the housing 60a.

The housing 60a can include a first housing 61a shaped into an enclosure having an open surface facing the fixing panel 15, and a second housing 62a closing the open surface of the first housing 61a.

The first housing 61a can be provided with a first shaft support 611a and a first shaft through-hole 612a penetrating through the first shaft support 611a. The first shaft 63a is inserted into the first shaft through-hole 612a to pass through the first housing 61a, and the first shaft 63a can be provided with a first shaft bearing 613a that fixes the first shaft 63a rotatably to the first housing 61a.

The first shaft support 611a can be provided in the form of a boss protruding from the first housing 61a toward the rotor body 52a or a boss protruding from the first housing 61a toward the second housing 62a.

When the first shaft support 611a is provided as a boss protruding from the first housing 61a toward the second housing 62a (protruding from the first housing 61a toward the center of the housing 60a), the volume of the housing 60a can be minimized (the volume of the driving unit D and the volume of the dryer 100 can be minimized).

The second housing 62a can be provided with a second shaft support 621a and a second shaft through-hole 622a penetrating through the second shaft support 621a. The second shaft 652a can pass through the second housing 62a through the second shaft through-hole 622a, and a second shaft bearing 623a rotatably fixed to the second housing 62a can be provided on the second shaft support 621a. Because the second shaft 652a is rotatably supported by the second shaft bearing 623a, the driven gear 65a can be rotatably supported inside the housing 60a.

The second shaft support 621a can be provided as a boss protruding from the second housing 62a toward the fixing panel through-hole 155 (toward the rear cover 23 of the drum 20).

A pair of first shaft bearings 613a can be arranged in parallel in the length direction of the first shaft 63a in the first shaft support 611a. A pair of second shaft bearings 623a can be arranged in parallel in the length direction of the second shaft 652a in the second shaft support 621a.

When at least two first shaft bearings 613a and at least two second shaft bearings 623a are provided, the eccentricity of the first shaft 63a and the second shaft 652a can be minimized during rotation of the rotor 52. That is, when a plurality of first shaft bearings 613a and a plurality of second shaft bearings 623a are provided, the eccentricity of the first shaft 63a and the second shaft 652a can be minimized during rotation of the first shaft 63a and the second shaft 652a.

If the driving unit D is large in volume, it is difficult to increase the number of bearings. Because the volume of the driving unit D can be minimized by a structure in which the housing 60a is located in the core through-hole 512 of the stator 51, and the boss structure of the first shaft support 611a protruding toward the center of the housing 60a, the number of first shaft bearings 613a and the number of second shaft bearings 623a can be increased.

To minimize the volume of the housing 60a, the diameters of the first housing 61a and the second housing 62a can be set to be different. That is, the diameter of the first housing 61a can be set smaller or larger than the diameter of the second housing 62a. To minimize the volume of the housing 60a, each of the first and second housings 61a and 62a can have a cylindrical shape corresponding to the core through-hole 512.

Alternatively, the outer shapes of the first housing 61a and the second housing 62a can correspond to the outer shape of the interlocking gears 64a according to the number of the interlocking gears 64a provided inside the housing 60a.

Specifically, a plurality of interlocking gears 64a can be provided around the first shaft 63a and the second shaft 652a coaxial with the first shaft 63a. When three or more interlocking gears 64a are provided, an outer surface formed by the interlocking gears 64a can be polygonal. Therefore, the housing 60a including the first housing 61a and the second housing 62a can be triangular for three interlocking gears 64a and rectangular for four interlocking gears 64a.

The housing 60a can be fixed by the driving unit bracket 4 coupled with the driving unit mounting recess 153 of the fixing panel 15. The driving unit bracket 4 can have an outer circumferential surface corresponding to the driving unit mounting recess 153 and an inner circumferential surface corresponding to the outer shape of the housing 60a.

The interlocking gears 64a are rotatably provided by connection shafts 625a located between the first housing 61a and the second housing 62a. As many connection shafts 625a as the number of interlocking gears 64a can be provided.

The power transmitter 6 will be described with the appreciation that there are three interlocking gears 64a apart from each other by 120 degrees and three connection shafts 625a apart from each other by 120 degrees, by way of example.

Each of the interlocking gears 64a can include a first body 641a rotatably coupled with a connection shaft 625a through the connection shaft 625a, a first gear 642a provided on the circumferential surface of the first body 641a and meshed with the driving gear 631a of the first shaft 63a, a second body 643a fixed to the first body 641a and having a smaller diameter than the first body 641a, and a second gear 644a provided on the circumferential surface of the second body 643a and coupled with the driven gear 65a provided with the second shaft 652a.

First connection shaft holes and second connection shaft hole (624a) for fixing the connection shafts 625a are formed at opposing positions in the first housing 61a and the second housing 62a, respectively. Bearings for rotatably supporting the connection shafts 625a can be provided in the first connection shaft holes and the second connection shaft holes 624a.

The second shaft 652a provided on the driven gear 65a can be inserted into the fixing panel through-hole 155 to connect to the rear cover 23 of the drum 20. To prevent the rotation of the second shaft 652a from damaging the rear cover 23, a separate shaft bracket to which one end of the second shaft 652a is fixed can be provided on the rear cover 23.

Referring to FIG. 4, the driving gear 631a of the first shaft 63a can be located in a space defined among the first gears 642a. Further, the free end of the first shaft support 611a can be inserted into the first shaft through-hole 612a formed at the center of the first housing 61a to pass through the housing 60a. This structure (the structure of the first shaft support 611a and the first housing 61a) can minimize the volume of the housing 60a.

To seal the fixing panel through-hole 155 (to prevent air supplied to the drum from leaking to the outside of the cabinet 1), the driving unit bracket 4 or the fixing panel can be further provided with a seal 41. When the driving unit bracket 4 is shaped into a ring surrounding the fixing panel through-hole 155, the ring-shaped core 511 is fixed to the driving unit bracket 4, and the housing 60a is located in the core through-hole 512, the seal 41 can be provided to seal the space defined between the driving unit bracket 4 and the second housing 62a.

Figure 6:
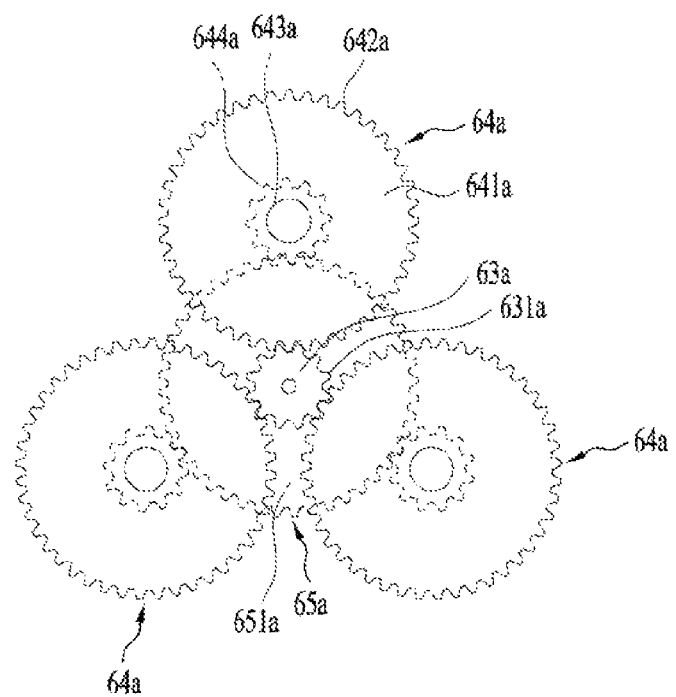
FIG. 6 is a simplified view illustrating the gear unit in the driving unit.
Figure 7:
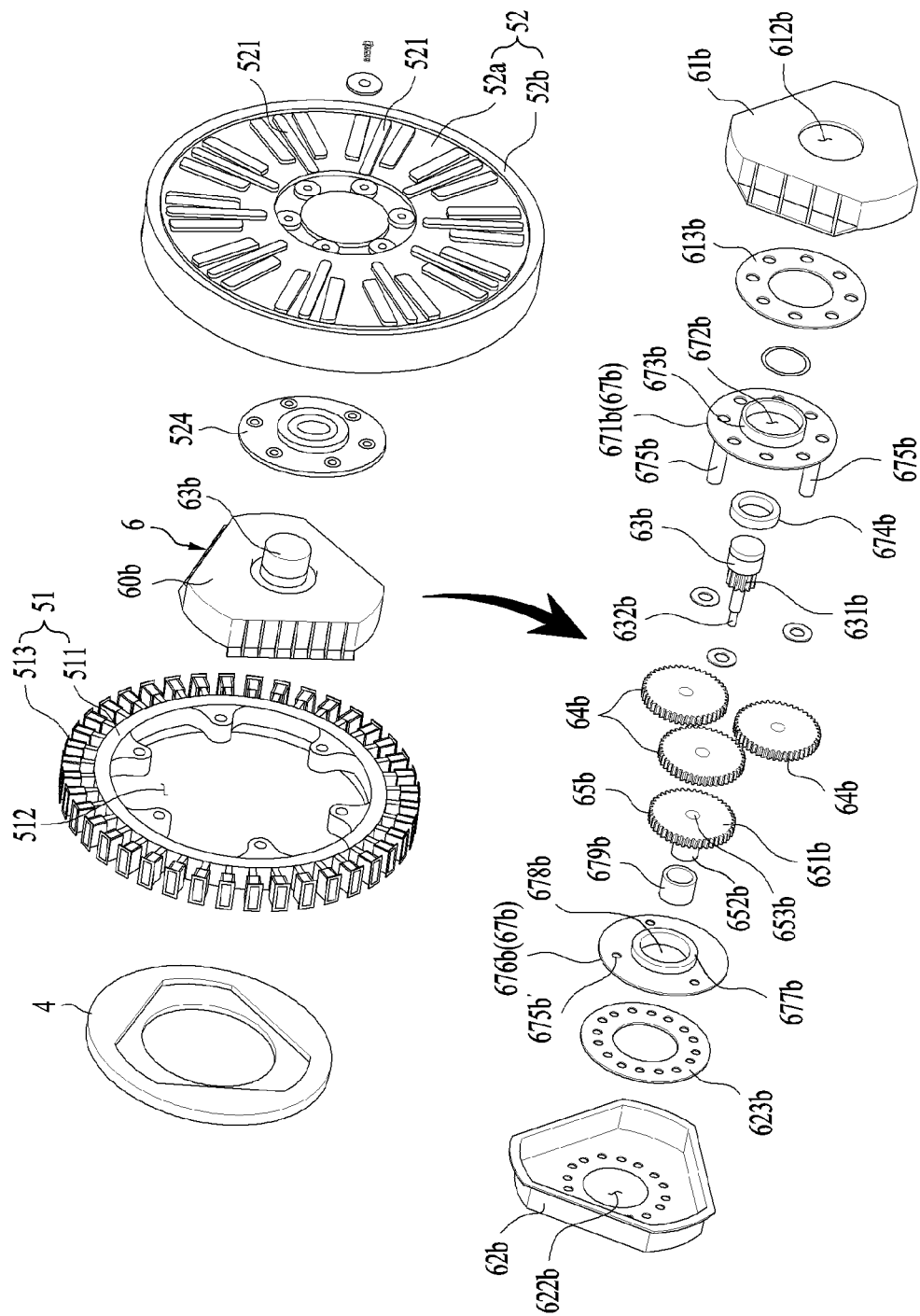
FIG. 7 is an exploded perspective view illustrating an example of a driving unit in a dryer.
Figure 8:
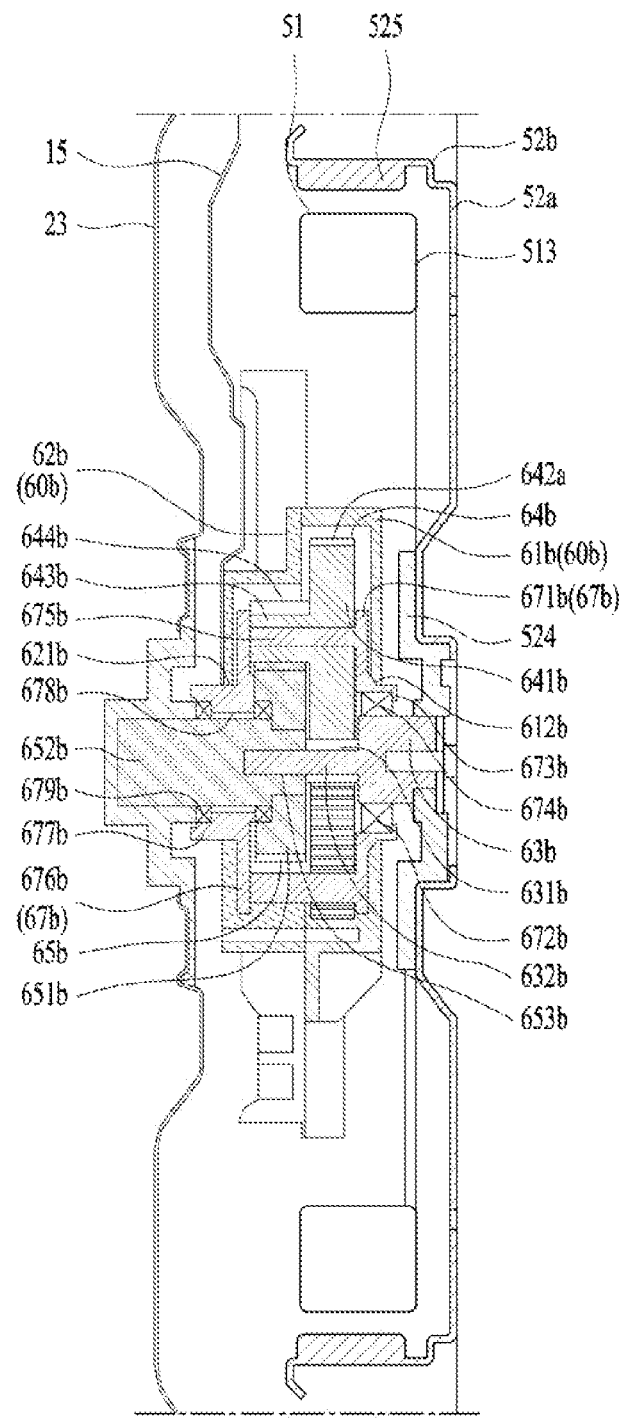
FIG. 8 is a sectional view illustrating the driving unit in the dryer of FIG. 7.

The driving unit D having the above-described structure operates as follows. Referring to FIG. 6, when the rotor 52 rotates clockwise, the first shaft 63a and the driving gear 631a also rotate clockwise.

When the driving gear 631a rotates clockwise, the interlocking gears 64a are rotated counterclockwise by the first gears 642a. When the first gears 642a rotate counterclockwise, the second gears 644a also rotate counterclockwise.

Because the interlocking gears 64a are rotatably supported inside the housing when the second gears 644a rotate counterclockwise, the driven gear 65a rotates clockwise.

The drum 20 and the driven gear 65a are coupled by the second shaft 652a. Therefore, the drum 20 rotates in the same direction as the rotor 52.

As illustrated in the drawing, the diameter of each of the first gears 642a can be set to be larger than the diameter of the driving gear 631a, and the diameter of the each of the second gears 644a can be set to be smaller than the diameter of each of the first gears 642a.

When the first gears 642a, the second gears 644a, and the driving gear 631a are provided as described above, the driving unit D can rotate the drum 20 with a smaller number of revolutions than that of the rotor 52. That is, the driving unit D can also serve as a decelerator.

As the driving gear 631a meshed with the first gears 642a of the interlocking gears 64a is even with the first gears 642a, and the driven gear 65a meshed with the second gears 644a of the interlocking gears 64a are even with the second gears 644a, the installation volume of the driving gear 631a, the interlocking gears 64a, and the driven gear 65a in the housing 60a can be minimized.

In some implementations, in the state where the driving gear 631a of the first shaft 63a is meshed with the first gears 642a of the interlocking gears 64a, and the driven gear 65a with the second shaft 652a formed thereon is meshed with the second gears 644a of the interlocking gears 64a, the first shaft 63a and the second shaft 652a can be coaxially coupled with each other. Therefore, when rotation of the first shaft 63a is transferred to the interlocking gears 64a and then to the driven gear 65a, eccentricity can be prevented between the first shaft 63a and the driven gear 65a.

With the attached drawings, another example of a power transmitter will be described below in detail.

Referring to FIGS. 7 to 10, in some implementations, the power transmitter 6 can include a housing 60b shaped into a hollow enclosure and fixed to the fixing panel 15, a first shaft 63b having one end connected to the rotor body 52a and the other end located inside the housing 60b, and including a driving gear 631b formed thereon, a plurality of interlocking gears 64b meshed with the driving gear 631b of the first shaft 63b, a driven gear 65b meshed with the interlocking gears 64b and including a second shaft 652b coupled to the rear cover 23, and a carrier 67b rotatably supporting the first shaft 63b, the interlocking gears 64b, and the driven gear 65b and fixed to the housing 60b.

In some implementations, the housing 60b can be fixed to the fixing panel 15 and located in the core through-hole 512. The volume of the driving unit D can be minimized by minimizing the volume of the housing 60b.

The housing 60b can include an enclosure-shaped first housing 61b having an opened surface facing the fixing panel 15, and a second housing 62b closing the open surface of the first housing 61b.

The first housing 61b can be provided with a first shaft through-hole 612b through which the first shaft 63b passes and is exposed. The first shaft 63b can be inserted into the first shaft through-hole 612b to pass through the first housing 61b and be coupled to the rotor body 52a.

The second housing 62b can be provided with a second shaft through-hole 622b through which the second shaft 652b passes and is exposed. The second shaft 652b can be inserted into the second shaft through-hole 622b to pass through the second housing 62b and be coupled to the rear cover 23 of the drum 20.

The housing 60b can be fixed by the driving unit bracket 4 coupled with the driving unit mounting recess 153 of the fixing panel 15. The driving unit bracket 4 can have an outer circumferential surface corresponding to the driving unit mounting recess 153 and an inner circumferential surface corresponding to the outer shape of the housing 60b.

The outer shapes of the first housing 61b and the second housing 62b can correspond to the outer shape of the interlocking gears 64b according to the number of interlocking gears 64b provided inside the housing 60b.

Specifically, a plurality of interlocking gears 64b can be provided around the first shaft 63b and the second shaft 652b coaxial with the first shaft 63b. When three or more interlocking gears 64b are provided, an outer surface formed by the interlocking gears 64b can be polygonal. Therefore, the housing 60b including the first housing 61b and the second housing 62b can be triangular for three interlocking gears 64b and rectangular for four interlocking gears 64b.

A ring-shaped first carrier damper 613b and a ring-shaped second carrier damper 623b can be provided respectively between the first housing 61b and the carrier 67b and between the second housing 62b and the carrier 67b, to prevent vibrations and noise generated during operation of the first shaft 63b, the interlocking gears 64b, and the driven gear inside the carrier 67b from being transferred to the first housing 61b and the second housing 62b.

The carrier 67b is used to couple the first shaft 63b, the interlocking gears 64b, and the driven gear 65b with the housing 60b, simultaneously with rotatably supporting them.

The carrier 67b is used to fix the first shaft 63b, the interlocking gears 64b, and the driven gear 65b to the housing 60b by separately fastening them and thus preventing eccentricity between the first shaft 63b and the driven gear 65b provided with the second shaft 652b. The carrier 67b can improve the assembly of the power transmitter 6 and prevent eccentricity among the first shaft 63b, the interlocking gears 64b, and the driven gear 65b.

The carrier 67b includes a carrier cover 671b located facing the inner surface of the first housing 61b and rotatably supporting the first shaft 63b, and a carrier base 676b located facing the inner surface of the second housing 62b and rotatably supporting the second shaft 652b.

The interlocking gears 64b can be rotatably provided between the carrier cover 671b and the carrier base 676b. The carrier cover 671b is provided with a plurality of connection shafts 675b into which the interlocking gears 64b are rotatably inserted. A plurality of connection shaft grooves 675b' into which the connection shafts 675b are inserted are formed on the carrier base 676b.

The carrier cover 671b can be provided with a first shaft support 673b and a first shaft support hole 672b penetrating through the first shaft support 673b. The first shaft 63b is inserted into the first shaft through-hole 612b to pass through the carrier cover 671b, and the first shaft 63b can be provided with a first shaft bearing 674b rotatably fixing the first shaft 63b to the carrier cover 671b.

The first shaft support 673b can be provided in the form of a boss protruding from the carrier cover 671b toward the center of the carrier cover 671ba or a boss protruding from the carrier cover 671b toward the carrier base 676b.

When the first shaft support 673b is provided as a boss protruding from the carrier cover 671b toward the carrier base 676b, the volume of the carrier 67b can be minimized.

The carrier base 676b can be provided with a second shaft support 677b and a second shaft support hole 678b penetrating through the second shaft support 677b. The second shaft 652b passes through the carrier base 676b through the second shaft support hole 678b, and the second shaft support 677b can be provided with a second shaft bearing 679b rotatably fixing the second shaft 652b to the carrier base 676b.

The second shaft support 677b can be provided as a boss protruding from the carrier base 676b toward the second housing 62b or a boss protruding from the carrier base 676b toward the carrier cover 671b.

A pair of first shaft bearings 674b can be arranged in parallel in the length direction of the first shaft 63b in the first shaft support 673b. A pair of second shaft bearings 679b can be arranged in parallel in the length direction of the second shaft 652b in the second shaft support 677b.

When at least two first shaft bearings 674b and at least two second shaft bearings 679b are provided, the eccentricity of the first shaft 63b and the second shaft 652b can be minimized during rotation of the rotor 52. That is, when a plurality of first shaft bearings 674b and a plurality of second shaft bearings 679b are provided, the eccentricity of the first shaft 63b and the second shaft 652b can be minimized during rotation of the first shaft 63b and the second shaft 652b.

The first shaft 63b is used to transfer the rotational force of the rotor 52 to the interlocking gears 64b. The first shaft 63b can be provided with the driving gear 631 b located inside the carrier 67b. The first shaft 63b can extend from the driving gear 631b located inside the carrier 67b, be rotatably supported by the first shaft support 673b of the carrier cover 671b, extend to the outside of the housing 60b through the first shaft through-hole 612b, and be coupled to the rotor body 52a.

When the first shaft 63b is directly coupled to the rotor body 52a, deformation can occur between the first shaft 63b and the rotor body 52a. To prevent deformation of the rotor body 52a, the first shaft 63b can be fixed to the rotor body 52a through the fixing plate 524. The fixing plate 524 can be fixed to the rotor body 52a, thereby reinforcing the strength of the rotor body 52a.

A driving gear shaft 632b is formed on an end of the driving gear 631 b, to be inserted into a first shaft hole 653b of the driven gear 65b. The driving gear shaft 632b and the first shaft hole 653b are formed such that the rotation center of the first shaft 63b and the rotation center of the driven gear 65b coincide with each other. That is, the driving gear 631b of the first shaft 63b and the second shaft 652b of the driven gear 65b can rotate on the same rotation axis.

The driven gear 65b can include a driven gear body 651b meshed with the interlocking gears 64b, the first shaft hole 653b formed at the center of the rotation axis of the driven gear body 651b to allow the driving gear shaft 632b of the first shaft 63b to be inserted therethrough, and a first shaft hole bearing 654b provided in the first shaft hole 653b and rotatably supporting the driving gear shaft 632b.

As the driving gear shaft 632b is inserted into the first shaft hole 653b, the first shaft 63b and the driven gear 65b can be rotatably coupled with each other in a coaxial state. The coaxial coupling between the first shaft 63b and the driven gear 65b can prevent eccentricity during rotation of the first shaft 63b and the driven gear 65b.

The second shaft 652b is used to transfer the rotational force of the interlocking gears 64b to the drum 20. The second shaft 652b can be provided inside the carrier 67b and extend from the driven gear 65b receiving power from the interlocking gears 64b. That is, the second shaft 652b can be rotatably supported by the second shaft support 677b of the carrier base 676b and extend to the outside of the housing 60b through the second shaft through-hole 622b.

In some implementations, the second shaft 652b can define a concentric axis with the first shaft 63b. In some examples, where the second shaft 652b and the first shaft 63b form a concentric axis, vibrations generated in the power transmitter 6 can be minimized during rotation of the drum 20.

The second shaft 652b can extend outward from the carrier 67b (i.e., in a direction to the drum 20) around the rotation axis of the driven gear 65b. The second shaft 652b can be integrally formed with the driven gear 65b.

The second shaft 652b can extend from the driven gear 65b located inside the carrier 67b, be rotatably supported by the second shaft support 677b of the carrier base 676b, extend outward from the housing 60b through the second shaft through-hole 622b, and be coupled to the rear cover 23.

The interlocking gears 64b can be rotatably provided between the carrier cover 671b and the carrier base 676b by the connection shafts 675b provided in the carrier 67b. As many connection shafts 675b as the number of interlocking gears 64b can be provided.

The power transmitter will be described with the appreciation that there are three interlocking gears 64b apart from each other by 120 degrees and three connection shafts 675b apart from each other by 120 degrees, by way of example.

A plurality of connection shafts 675b extending toward the carrier base 676b can be provided on the carrier cover 671b. The connection shaft grooves 675b' into which the connection shafts 675b are inserted are formed on the carrier base 676b. Bearings for rotatably supporting the interlocking gears 64b can be provided between the connection shafts 675b and the interlocking gears 64b.

Each of the interlocking gears 64b can include a first body 641b rotatably coupled with a connection shaft 675b through the connection shaft 675b, a first gear 642b provided on the circumferential surface of the first body 641b and meshed with the driving gear 631b of the first shaft 63b, a second body 643b fixed to the first body 641b and having a smaller diameter than the first body 641b, and a second gear 644b provided on the circumferential surface of the second body 643b and coupled with the driven gear 65b provided with the second shaft 652b.

The second shaft 652b provided in the driven gear 65b can be inserted into the fixing panel through-hole 155 to connect to the rear cover 23 of the drum 20. To prevent the rotation of the second shaft 652b from damaging the rear cover 23, a separate shaft bracket to which one end of the second shaft 652b is fixed can be provided on the rear cover 23.

Figure 9:
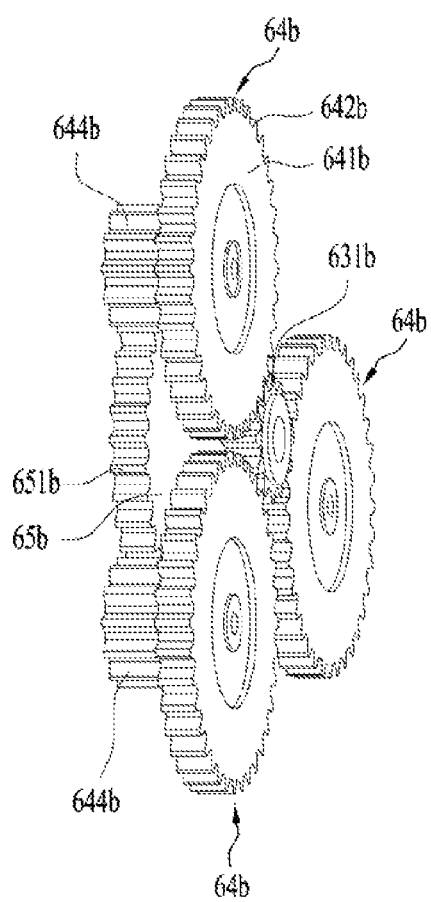
FIG. 9 is a perspective view illustrating an example of a gear unit in the driving unit of FIG. 7.
Figure 10:
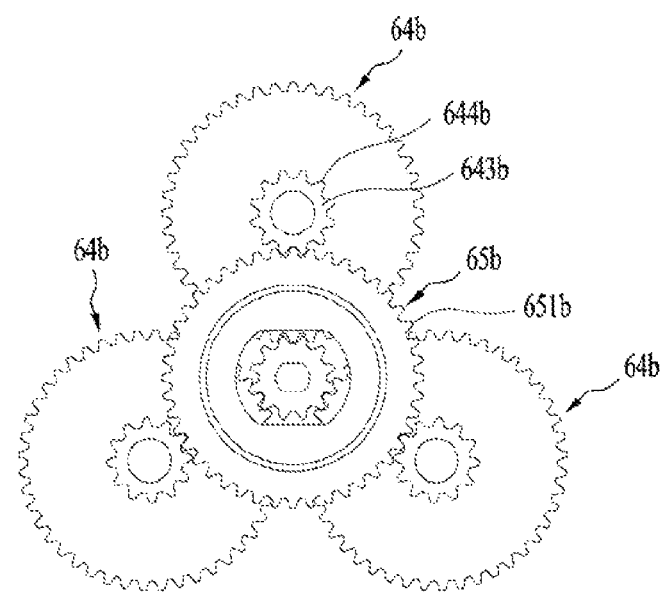
FIG. 10 is a simplified view illustrating the gear unit in the driving unit according of FIG. 7.

Referring to FIGS. 9 and 10, in some implementations, the driving gear 631b of the first shaft 63b can be located in a space defined among the first gears 642b. Further, the free end of the first shaft support 673b can be inserted into the first shaft support hole 672b formed at the center of the carrier cover 671b to pass through the first shaft through-hole 612b of housing 60b. This structure can minimize the volumes of the carrier 67b and the housing 60b.

To seal the fixing panel through-hole 155 (to prevent air supplied to the drum from leaking to the outside of the cabinet 1), the driving unit bracket 4 or the fixing panel can be further provided with the seal 41. When the driving unit bracket 4 is shaped into a ring surrounding the fixing panel through-hole 155, the ring-shaped core 511 is fixed to the driving unit bracket 4, and the housing 60b is located in the core through-hole 512, the seal 41 can seal the space defined between the driving unit bracket 4 and the second housing 62b.

The driving unit D having the above-described structure can operate as follows. Referring to FIG. 10, when the rotor 52 rotates clockwise, the first shaft 63b and the driving gear 631b also rotate clockwise.

When the driving gear 631b rotates clockwise, the interlocking gears 64b are rotated counterclockwise by the first gears 642b. When the first gears 642b rotate counterclockwise, the second gears 644b also rotate counterclockwise.

Because the interlocking gears 64b are rotatably supported inside the housing when the second gears 644b rotate counterclockwise, the driven gear 65b rotates clockwise.

The drum 20 and the driven gear 65b are coupled by the second shaft 652b. Therefore, the drum 20 rotates in the same direction as the rotor 52.

As illustrated in the drawing, the diameter of each of the first gears 642b can be set to be larger than the diameter of the driving gear 631b, and the diameter of each of the second gears 644b can be set to be smaller than the diameter of each of the first gears 642b.

When the first gears 642b, the second gears 644b, and the driving gear 631b are provided as described above, the driving unit D can rotate the drum 20 with a smaller number of revolutions than that of the rotor 52. That is, the driving unit D can also serve as a decelerator.

As described above, in the power transmitter 6, as the driving gear 631b meshed with the first gears 642b of the interlocking gears 64b is even with the first gears 642b, and the driven gear 65b meshed with the second gears 644b of the interlocking gears 64b are even with the second gears 644b, the installation volume of the driving gear 631b, the interlocking gears 64b, and the driven gear 65b in the housing 60b can be minimized.

In some implementations, in the state where the driving gear 631 b of the first shaft 63b is meshed with the first gears 642b of the interlocking gears 64b, and the driven gear with the second shaft 652b formed thereon is meshed with the second gears 644b of the interlocking gears 64b, the first shaft 63b and the second shaft 652b are coaxially coupled with each other in the carrier 67b. Therefore, when rotation of the first shaft 63b is transferred from the interlocking gears 64b to the driven gear 65b, eccentricity can be prevented between the first shaft 35b and the driven gear 65b.

In some implementations, the first shaft 63b provided with the driving gear 631b, the interlocking gears 64b, and the driven gear 65b provided with the second shaft 652b assembled in the carrier 67b are coupled with the inside of the housing 60b, and the housing 60b is fixed to the fixing panel 15 by the driving unit bracket 4. Therefore, the assembly process of the driving unit D can be simplified.

Figure 11:
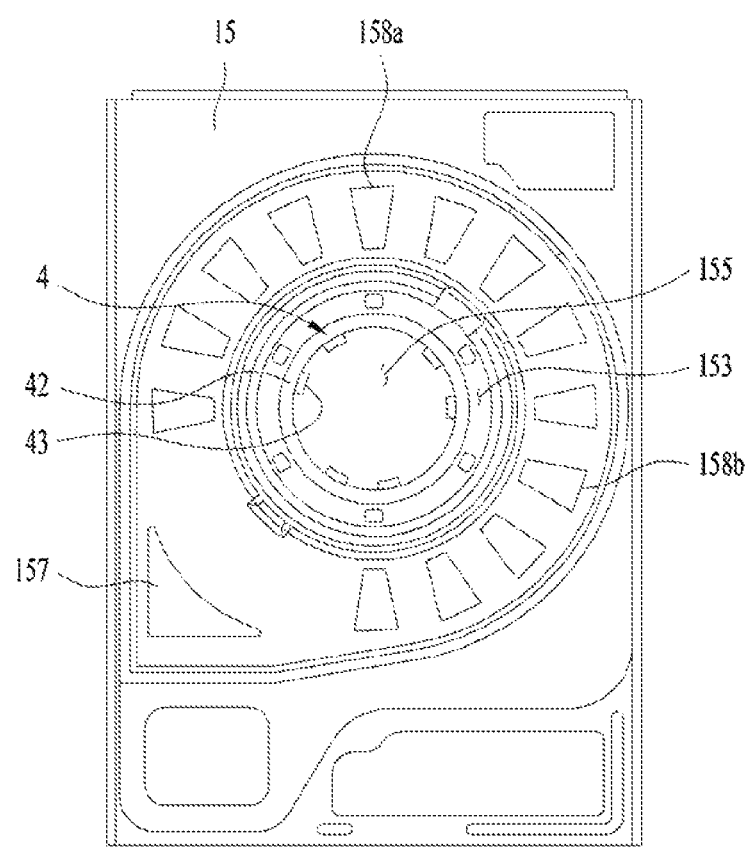
FIG. 11 is a rear view illustrating an example of a driving unit bracket.
Figure 12:
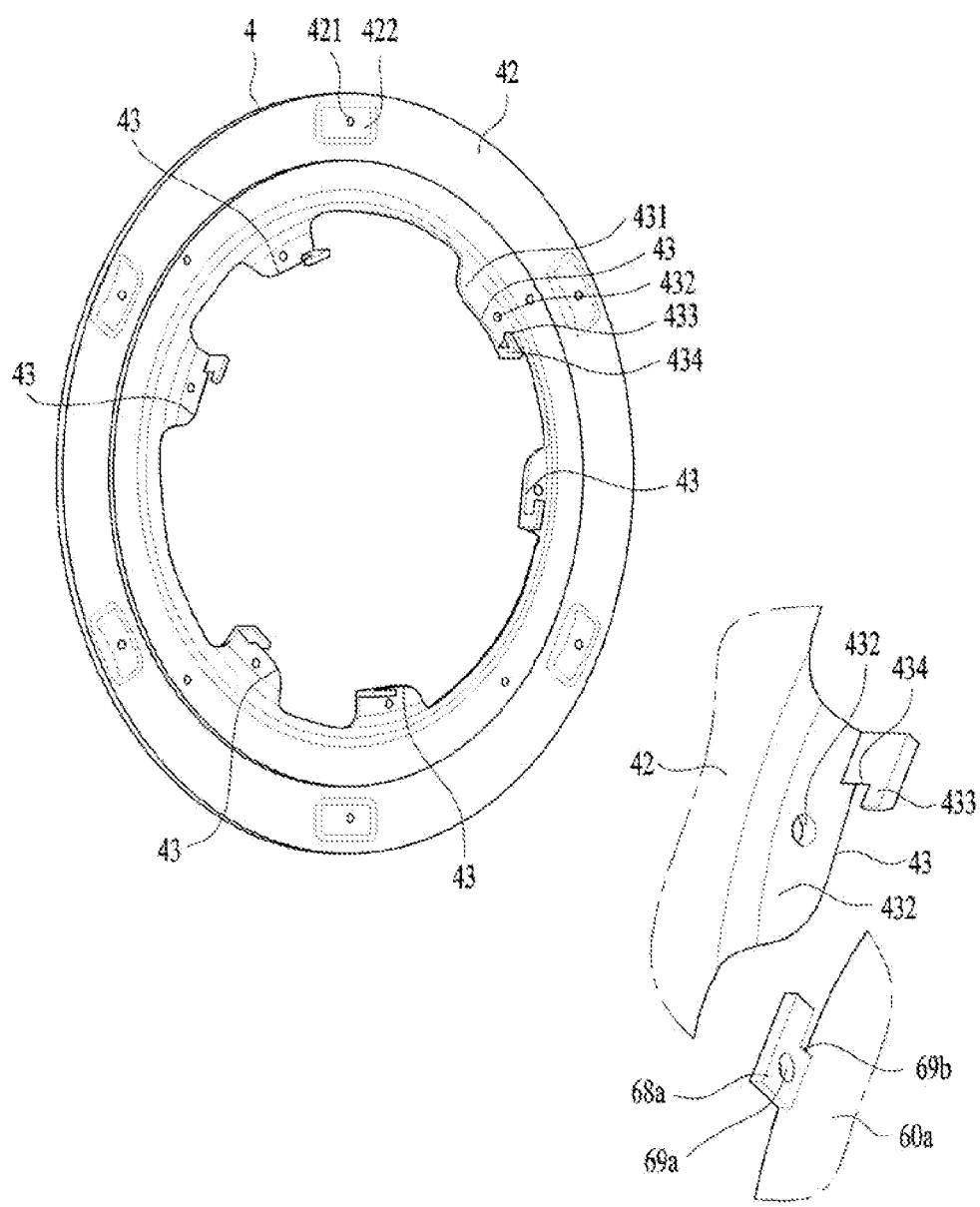
FIG. 12 is a perspective view illustrating the driving unit bracket.

The driving unit bracket 4 is coupled in the driving unit mounting recess 153 to minimize deformation of the fixing panel 15 by the weight of the driving unit D and an external force generated during operation of the driving unit D, as illustrated in FIGS. 11 to 12.

The motor 5 and the power transmitter 6 fixed to the driving unit bracket 4 can be coupled with each other by the driving unit D, so that the motor 5 and the power transmitter 6 have a coaxial rotation axis. That is, the power transmitter 6 can be coupled at the center of the driving unit bracket 4, and an outer portion of the stator 51 can be coupled with an outer portion of the driving unit bracket 4 by a separate coupling member.

The driving unit bracket 4 can include motor coupling holes 421 coupled with the stator 51 with the fixing panel 15 interposed therebetween, a ring portion 42 defining an installation space for the housing 60a or 60b at center, and housing coupling portions 43 protruding from an inner circumferential surface of the ring portion 42 to receive and fix the housing 60a or 60b.

The ring portion 42 can include protrusions 422 protruding from the rear of the fixing panel 15 toward the stator 51 can further be formed so that the motor coupling holes 421 form a coupling tolerance with the stator 51. The motor coupling holes 421 can be formed in the protrusions 422. Accordingly, the driving unit bracket 4 and the stator 51 can be coupled with the fixing panel 15 in the order of the protrusions 422, the driving unit mounting recess 153, and the stator 51.

Housing fixing protrusions 68a corresponding to the housing coupling portions 43 can protrude from the outer surface of the housing 60a or 60b of the power transmitter 6. The housing fixing protrusions 68a are formed with the same radius around the rotation axis of the second shaft 652a or 652b of the housing 60a or 60b. Housing fixing holes 69a are formed in the housing fixing protrusions 68a, to allow separate fastening members to be inserted therein.

A plurality of housing coupling portions 43 and a plurality of housing fixing protrusions 68a can be provided in a one-to-one correspondence. At least three pairs of housing coupling portions 43 and housing fixing protrusions 68a can be provided.

The motor coupling holes 421 and the housing coupling portions 43 can be arranged with the same radius around the rotation axis of the second shaft 652a or 652b of the housing 60a or 60b. Accordingly, the stator 51 of the motor 5 coupled with the motor coupling holes 421 and the second shaft 652a or 652b of the housing 60a or 60b coupled with the housing coupling portions 43 can be coupled with the driving unit bracket 4 so as to have the same center axis.

Each of the housing coupling portions 43 is provided with a housing coupling jaw 431 protruding from the inner circumferential surface of the ring portion 42, and a locking protrusion 433 bent from the housing coupling jaw 431 in a direction opposite to a direction in which the housing 60*a* or 60*b* is inserted.

In each of the housing coupling portions 43, a housing coupling hole 432 corresponding to a housing fixing hole 69*a* is formed, on which the front surface of the second housing 62*a* or 62*b* is mounted. A separate coupling member can be fixedly inserted into the housing coupling hole 432 and the housing fixing hole 69*a*.

A locking groove 434 is formed on each of the locking protrusions 433, to allow a housing fixing protrusion 68*a* to be inserted therethrough. The locking groove 434 is formed in the lateral direction of the locking protrusion 433. As the housing 60*a* or 60*b* is mounted in the driving unit bracket 4 and then rotates around its center, the housing fixing protrusion 68*a* can be inserted into the locking groove 434.

The housing fixing protrusion 68*a* can have a housing fixing groove 69*b* formed thereon at a position corresponding to the locking groove 434. As the housing fixing groove 69*b* is crossly inserted in the locking groove 434, the housing 60*a* or 60*b* can be fixed to the driving unit bracket 4.

The housing fixing groove 69*b* can be formed in the form of an inclined surface with an extended entrance. As the housing fixing groove 69*b* is crossly inserted in the locking groove 434, from the inlet of the housing fixing groove 69*b* to the inside of the housing fixing groove 69*b*, the positions of the housing 60*a* or 60*b* can move and be fixed to the center of the driving unit bracket 4.

The strength of the fixing panel 15 can be reinforced by coupling the driving unit bracket 4 in the driving unit mounting recess 153. At the same time, when the housing 60*a* or 60*b* is coupled with the driving unit bracket 4, the installation position of the housing 60*a* or can be corrected to the center of the driving unit bracket 4. In addition, the rotation axes of the motor 5 and the power transmitter 6 can become coaxial by coupling the stator 51 of the motor 5 and the housing 60*a* or 60*b* of the power transmitter 6 with the driving unit bracket 4.

Figure 13:
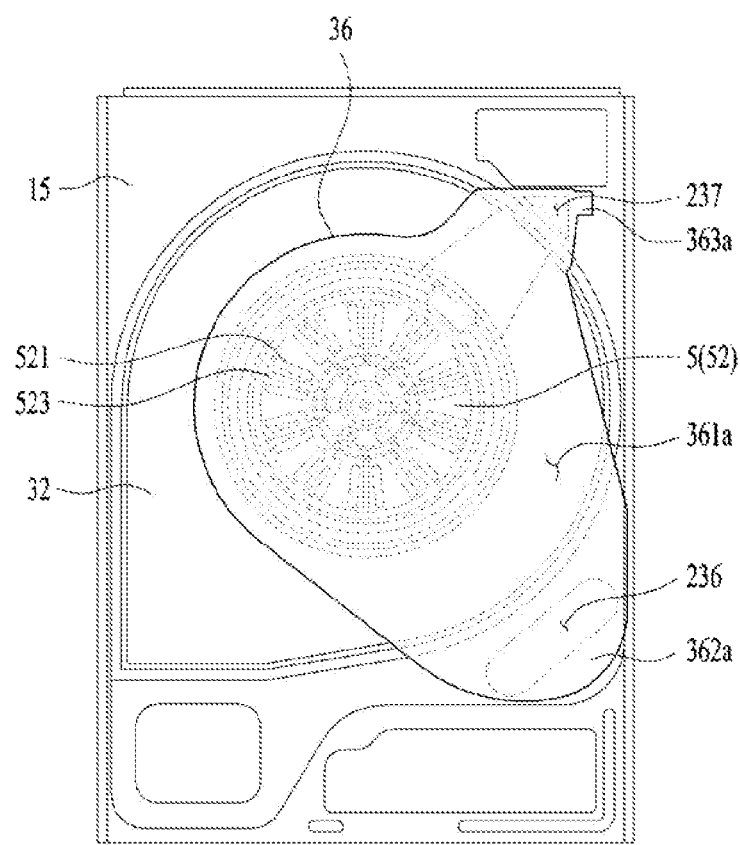
FIG. 13 is a rear view illustrating an example of a driving unit cooling structure.

The rear cover 23 of the drum 20 can be provided with a plurality of supply holes 158*a* and 158*b* arranged in the shape of a ring. As illustrated in FIGS. 2 and 13, the dryer 100 can further include a flow guide 324 for evenly supplying air discharged from the second exhaust port 157 to the supply holes 158*a* and 158*b*.

Because air moves to a location having a smaller flow resistance, in the case of a dryer 100 without the flow guide 324, the air introduced into the duct body 321 through the second exhaust port 157 flows into the duct body 321 along the clockwise direction at a different amount from the air flowing into the duct body 321 along the counterclockwise direction.

For example, when more air flows into the duct body 321 along the clockwise direction than along the counterclockwise direction, a large amount of air is supplied to the supply holes 158*a* on the left side of a reference line L, whereas a small amount of air is supplied to the supply holes 158*b* on the right side of the reference line L.

The above-described imbalance in the amount of air supply can cause an imbalance in the amount of air supplied to clothes in the drum 20. That is, the phenomenon that the amount of supplied air varies depending on the location of the clothes can cause a problem in that a drying time increases, and some clothes become over-dried while other clothes become under-dried.

The flow guide 324 can maintain the amount of air flowing into the duct body 321 along the clockwise direction to be equal or similar to the amount of air flowing into the duct body 321 along the counterclockwise direction, thereby solving the above problem. That is, this is because some of the air introduced into the duct body 321 by the flow guide 324 moves to the supply holes 158*a* located on the left side of the flow guide 324, and the rest of the air moves to the supply holes 158*b* on the right side of the flow guide 324.

In the dryer 100 having the above structure, the duct body 321 surrounds the motor 5 (because the motor 5 is located inside the rotor accommodator). Therefore, the motor 5 is likely to be overheated.

For effective cooling of the motor 5 (specifically, for cooling of the stator 51), a cooling passage can be further provided in the dryer 100.

Figure 14:
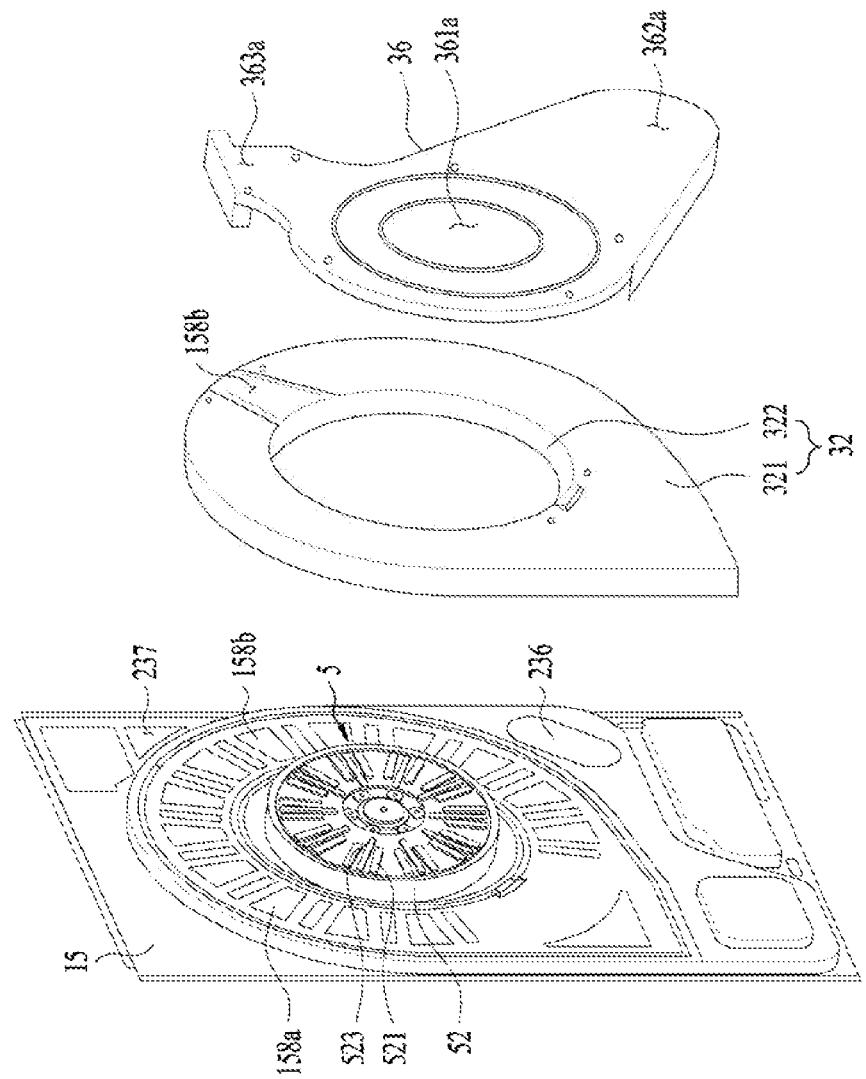
FIG. 14 is a perspective view illustrating the driving unit cooling structure.

FIGS. 13 and 14 illustrate the cooling passage. As illustrated, the cooling passage is for cooling the motor 5 by circulating air in the cabinet 1 with the motor 5.

The cooling passage can include a first cooling hole 236 formed under the rear cover 23 to penetrate through the cabinet 1, a second cooling hole 237 formed above the rear cover 23 to penetrate through the cabinet 1, and a duct cover 36 fixed to the exterior of the duct body 321 to communicate the first cooling hole 236 and the second cooling hole 237 with the rotor accommodator 322.

The first cooling hole 236 and the second cooling hole 237 penetrate through the rear cover 23 to circulate air in the rotor accommodator 322 and air inside the cabinet 1 and thus cool the motor 5 of the rotor accommodator 322.

The duct cover 36 can include a cover plate 361*a* covering the rotor accommodator 322, a first cooling duct 362*a* extending toward the first cooling hole 236, under the cover plate 361*a*, and a second cooling duct 363*a* extending to the second cooling hole 237, above the cover plate 361*a*.

That is, the duct cover 36 is coupled with the exterior of the duct body 321, to form a flow path in which the air inside the cabinet 1 flows to the first cooling hole 236, the rotor accommodator 322, and the first cooling hole 236.

Air inside the cabinet 1 is at a lower temperature than air drying the clothes inside the drum 20 by the heat exchange unit 34 and the supply duct 32, and flows to the rotor accommodator 322 through the cooling passage, thereby cooling the motor 5.

In some implementations, the base panel 17 can include a separate exhaust fan for discharging the air from the inside of the cabinet 1 to the outside of the cabinet 1 in order to cool heat generated from the compressor 345. Since the heated high-temperature air inside the cabinet 1 is discharged to the outside of the cabinet 1 by the exhaust fan, the air inside the cabinet 1 can be at a lower temperature than the air inside the heat exchanger 34, the supply duct 32, and the drum 20.

To facilitate discharge of air introduced from the first cooling duct 362*a* through the second cooling duct 363*a* and at the same time, effectively cool the motor 5, the rotor 52 can be further provided with a plurality of vanes 523.

Each of the vanes 523 can be provided as a board protruding from the rotor body 52*a* toward the duct cover 36. The vane 523 can be provided as a single plate or as a plurality of plates. In any case, the vanes 523 are preferably provided parallel to the radial direction of the rotor body 52*a*.

When the vanes 523 are provided as plates parallel to the radial direction of the rotor body 52*a*, the vanes 523 can function as an impeller that forcibly moves air in the rotor accommodator 322 during rotation of the rotor 52.

The rotor 52 can further include a rotor through-hole 521 penetrating the rotor body 52a to more effectively discharge heat generated in the stator 51 to the rotor accommodator 322. A plurality of rotor through-holes 521 can be arranged in a ring surrounding the first shaft 63a or 63b.

Each of the rotor through-holes 521 can be provided as a slit having a length in the radial direction of the rotor body 52a set longer than a length in the circumferential direction of the rotor body 52a. In this case, each of the vanes 523 can be fixed to the edge of a rotor through-hole 521 parallel to the radial direction of the rotor body 52a.

To more effectively cool the motor 5, the first cooling duct 362a, the center of rotation of the rotor 52, and the second cooling duct 363a can be arranged to extend on a single straight line.

Accordingly, when the rotor 52 rotates, external air is introduced into the rotor accommodator 322 through the first cooling hole 236 and the first cooling duct 362a. The air introduced into the rotor accommodator 322 cools the motor 5 and then is discharged to the outside of the rotor accommodator 322 through the second cooling duct 363a and the second cooling hole 237.

Figure 15:
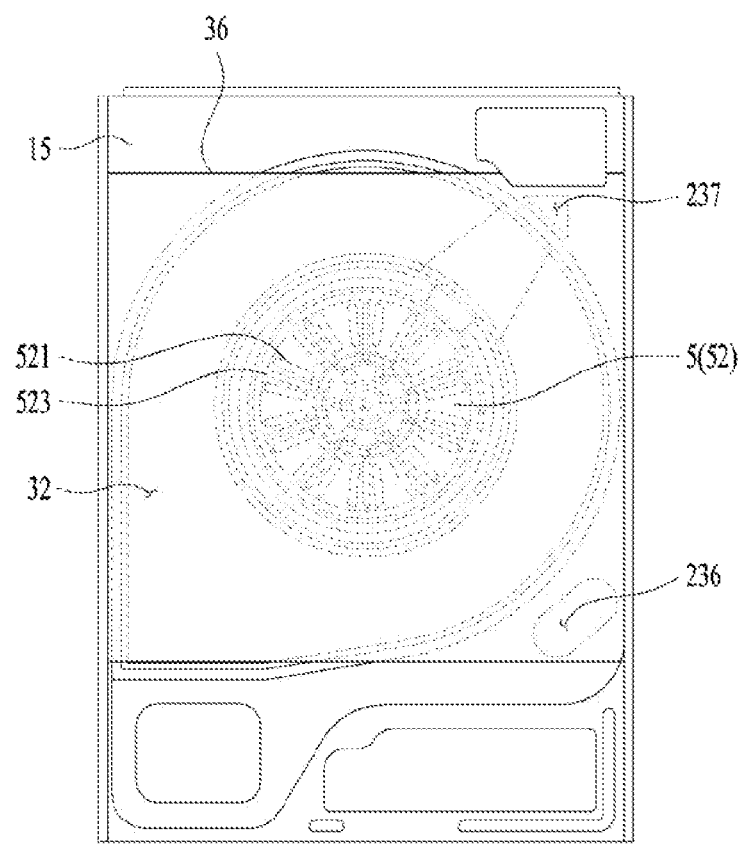
FIG. 15 is a rear view illustrating an example of a driving unit cooling structure.

FIGS. 15 and 16 illustrate a cooling passage. As illustrated, a predetermined portion of the fixing panel 15 is formed as the cooling passage to cool the motor 5.

The duct cover 36 is formed in the form of an enclosure having an open surface facing the supply duct 32 to cover the entire supply duct 32. The supply duct 32 is formed in the shape of a ring along the arrangement of the supply port 158 of the fixing panel 15, and the duct cover 36 is formed in a rectangle to cover the outer portion of the supply duct 32.

When the duct cover 36 covers the supply duct 32, a space is formed between the outer circumferential surface of the supply duct 32 and the inner corners of the duct cover 36, and the first cooling hole 236 and the second cooling hole 237 are formed at positions of the fixing panel 15 corresponding to inner corners of the duct cover 36.

The duct cover 36 can be provided with a cover plate 361b having a larger area than an area formed by the supply duct 32, the first cooling hole 236, and the second cooling hole 237, and a cover sidewall 362b fixed to the fixing panel 15 at a height higher than the supply duct 32, on the outer circumferential surface of the cover plate 361b.

The first cooling hole 236 and the second cooling hole 237 can communicate with each other by the cover plate 361b and the cover sidewall 362b, and the motor 5 provided in the rotor accommodator 322 can be cooled by air passing through the first cooling hole 236 and the second cooling hole 237.

The first cooling hole 236 and the second cooling hole 237 serve as a passage through which the air inside the cabinet 1 flows. The first cooling hole 236 can be formed on a lower part of the fixing panel 15, and the second cooling hole 237 can be formed on an upper part of the fixing panel 15. The first cooling hole 236 and the second cooling hole 237 allow the air in the cabinet 1 to flow into the duct cover 36. The first cooling hole 236 and the second cooling hole 237 can be formed at opposite corners with respect to the center of the supply duct 32.

To effectively cool the motor 5 while facilitating discharge of air introduced from the first cooling hole 236 through the second cooling hole 237, the rotor 52 can further include the plurality of vanes 523 serving as an impeller during rotation of the rotor 52, and the rotor through-hole 521 penetrating through the rotor body 52a. Since the vanes 523 and the rotor through-hole 521 have been described above, a detailed description thereof will not be provided herein.

A circulation fan can be further provided in one of the first cooling hole 236 and the second cooling hole 237 to forcibly circulate air in the cabinet 1 in the duct cover 36. When the circulation fan is provided, the motor 5 can be cooled more effectively.

While the dryer 100 has been described above in the context of a circulation-type drying system, the dryer 100 can also be applied to an exhaust-type drying system. The circulation-type drying system refers to a drying scheme in which air discharged from the drum 20 is dehumidified and heated sequentially, and then high-temperature dry air is re-supplied to the drum 20. The exhaust-type drying system refers to a drying scheme in which external air is heated and supplied to the drum 20, and after heat exchange, air discharged from the drum 20 is exhausted to the outside of the cabinet 1.

When the dryer 100 is provided as the exhaust-type drying system, the supply 3 can include an exhaust duct connecting the first exhaust port 128 and the second exhaust port 157, a supply duct supplying external air (air inside or outside the cabinet) to the drum 20, and a heat exchange unit heating the air introduced into the supply duct.

As is apparent from the foregoing description, the present disclosure can provide a dryer with a driving unit in which the rotation speed of a rotor is reduced and transmitted to a drum, and the rotation center of the rotor and the rotation center of the drum are located on a concentric axis.

Further, the present disclosure can provide a dryer in which the volume of a driving unit can be minimized.

Further, the present disclosure can provide a dryer with an improved flow path of air supplied to a drum.

Further, the present disclosure can provide a dryer with an improved cooling passage for a motor driving a drum.

Further, the present disclosure can provide a dryer with an improved fixing structure for fixing a motor and a power transmitter.

Further, the present disclosure can provide a dryer in which vibrations generated in a power transmitter transferring the power of a motor can be reduced.

The above description is merely illustrative of the technical idea of the present disclosure. It will be apparent to those skilled in the art that various modifications and variations can be made in the present disclosure without departing from the spirit or scope of the disclosures.

Therefore, the above detailed description is to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:
1. A dryer comprising:
   a drum comprising:
      a drum body that defines a space configured to receive clothes,
      a front cover that defines a front surface of the drum body, the front cover defining a drum inlet in communication with the space of the drum body, and
      a rear cover that defines a rear surface of the drum body, the rear cover defining an air inlet;

a fixing panel spaced apart from the rear cover of the drum, the fixing panel defining a first cooling hole and a second cooling hole that are spaced apart from each other;

a motor comprising a stator fixed to the fixing panel and a rotor configured to rotate relative to the stator, the motor being configured to rotate the drum based on the rotor rotating relative to the stator, wherein the fixing panel further defines a plurality of supply holes arranged along an outer circumferential surface of the motor and configured to guide air to the air inlet of the rear cover;

a supply duct fixed to the fixing panel and configured to guide air to the plurality of supply holes, the supply duct having a ring shape and defining an accommodating space that accommodates the motor; and a duct cover that is disposed at a rear side of the fixing panel, the duct cover defining a cooling passage that connects the first cooling hole, the accommodating space, and the second cooling hole and is configured to cool the motor in the accommodating space by circulating air through the first cooling hole, the accommodating space, and the second cooling hole, wherein the first cooling hole is defined at a lower part of the fixing panel relative to the accommodating space, and wherein the second cooling hole is defined at an upper part of the fixing panel relative to the accommodating space.

2. The dryer according to claim 1, wherein the supply duct defines an exhaust passage at a side thereof, the exhaust passage being configured to discharge air from the accommodating space, and wherein the second cooling hole faces an end of the exhaust passage.

3. The dryer according to claim 2, wherein the duct cover comprises:
a first cooling duct configured to guide air from the first cooling hole to the accommodating space;
a cover plate that covers the accommodating space and is configured to receive air guided by the first cooling duct; and
a second cooling duct that extends from the cover plate to the second cooling hole.

4. The dryer according to claim 2, wherein the duct cover is fixed to the fixing panel and defines an enclosure that covers the first cooling hole, the accommodating space, the supply duct, and the second cooling hole.

5. The dryer according to claim 4, wherein the duct cover comprises:
a cover plate having an area that is greater than areas defined by the first cooling hole, the supply duct, and the second cooling hole; and
a cover sidewall located at an outer circumferential surface of the cover plate and fixed to the fixing panel at a position above the supply duct.

6. The dryer according to claim 1, wherein the rotor comprises a plurality of vanes that extend in a radial direction and are configured to move air in the accommodating space.

7. The dryer according to claim 6, wherein the rotor defines a plurality of rotor through-holes that extend in the radial direction and are configured to discharge air from an inside of the rotor.

8. The dryer according to claim 1, further comprising a power transmitter that comprises:
a housing fixed to the fixing panel;
a first shaft located at the housing and coupled to the rotor;
a second shaft located at the housing and coupled to the rear cover of the drum; and
an interlocking gear located at the housing and configured to decelerate a rotational speed of the first shaft, the interlocking gear being configured to transmit rotational force from the first shaft to the second shaft.

9. The dryer according to claim 8, wherein the power transmitter further comprises:
a driving gear defined at an end of the first shaft and configured to transmit the rotational force to the interlocking gear; and
a driven gear defined at an end of the second shaft and configured to receive the rotational force from the interlocking gear, and wherein the interlocking gear comprises:
a first gear meshed with the driving gear and configured to be rotated by the driving gear, and
a second gear meshed with the driven gear and configured to rotate coaxially with the first gear, a diameter of the second gear being less than a diameter of the first gear.

10. A dryer comprising:
a drum comprising:
a drum body that defines a space configured to receive clothes,
a front cover that defines a front surface of the drum body, the front cover defining a drum inlet in communication with the space of the drum body, and
a rear cover that defines a rear surface of the drum body, the rear cover defining an air inlet;
a fixing panel spaced apart from the rear cover of the drum;
a motor comprising a stator fixed to the fixing panel and a rotor configured to rotate relative to the stator, the motor being configured to rotate the drum based on the rotor rotating relative to the stator, wherein the fixing panel further defines a plurality of supply holes arranged along an outer circumferential surface of the motor and configured to guide air to the air inlet;
a supply duct that is fixed to the fixing panel, the supply duct defining an accommodating space that accommodates the motor and a cooling passage that extends outward from the accommodating space, the cooling passage being configured to discharge air to an outside the supply duct; and
a duct cover that covers the accommodating space and the cooling passage, the duct cover being configured to guide air between the accommodating space and the cooling passage, wherein the fixing panel defines a first cooling hole and a second cooling hole that are spaced apart from each other, and wherein at least one of the first cooling hole or the second cooling hole is in fluid communication with an end of the cooling passage.

11. The dryer according to claim 10, wherein an inner circumferential surface of the accommodating space faces the outer circumferential surface of the motor, and wherein the cooling passage extends radially outward from the inner circumferential surface of the accommodating space to an outer circumferential surface of the supply duct.

12. The dryer according to claim 10, wherein the first cooling hole is defined at a lower part of the fixing panel relative to the accommodating space, and wherein the second cooling hole is defined at an upper part of the fixing panel relative to the accommodating space, the second cooling hole being in fluid communication with the end of the cooling passage.

13. The dryer according to claim 10, wherein the duct cover protrudes outward relative to an outer circumference of the supply duct and covers the first cooling hole and the second cooling hole.

14. The dryer according to claim 10, wherein the duct cover comprises:
a first cooling duct configured to guide air from the first cooling hole to the accommodating space;
a cover plate that covers the accommodating space and is configured to receive air guided by the first cooling duct; and
a second cooling duct that extends from the cover plate to the second cooling hole.

15. The dryer according to claim 10, wherein the duct cover comprises:
a cover plate that covers the accommodating space, the cover plate protruding outward relative to the supply duct to thereby cover the first cooling hole and the second cooling hole; and
a cover sidewall that extends from an outer circumferential surface of the cover plate to the fixing panel and is fixed to the fixing panel.

16. The dryer according to claim 10, wherein the first cooling hole and the second cooling hole are defined at positions outward relative to an outer circumferential surface of the supply duct.

17. The dryer according to claim 16, wherein the cooling passage extends from an inner circumference of the accommodating space to the outer circumferential surface of the supply duct, the cooling passage facing the second cooling hole.

18. A dryer comprising:
a drum comprising:
a drum body that defines a space configured to receive clothes,
a front cover that defines a front surface of the drum body, the front cover defining a drum inlet in communication with the space of the drum body, and
a rear cover that defines a rear surface of the drum body, the rear cover defining an air inlet;
a fixing panel spaced apart from the rear cover of the drum, the fixing panel defining a first cooling hole and a second cooling hole that are spaced apart from each other;
a motor comprising a stator fixed to the fixing panel and a rotor configured to rotate relative to the stator, the motor being configured to rotate the drum based on the rotor rotating relative to the stator, wherein the fixing panel further defines a plurality of supply holes arranged along an outer circumferential surface of the motor and configured to guide air to the air inlet of the rear cover;
a supply duct fixed to the fixing panel and configured to guide air to the plurality of supply holes, the supply duct having a ring shape and defining an accommodating space that accommodates the motor; and
a duct cover that connects together the first cooling hole, the accommodating space, and the second cooling hole, the duct cover being configured to circulate air through the first cooling hole, the accommodating space, and the second cooling hole to thereby cool the motor,
wherein the first cooling hole is defined at a lower part of the fixing panel relative to the accommodating space, and
wherein the second cooling hole is defined at an upper part of the fixing panel relative to the accommodating space.

19. The dryer according to claim 18, wherein the supply duct defines an exhaust passage at a side thereof, the exhaust passage being configured to discharge air from the accommodating space, and
wherein the second cooling hole faces an end of the exhaust passage.

* * * * *